(12) United States Patent
Cui et al.

(10) Patent No.: US 11,823,303 B2
(45) Date of Patent: Nov. 21, 2023

(54) DATA PROCESSING METHOD AND APPARATUS

(71) Applicant: HUAWEI TECHNOLOGIES CO., LTD., Shenzhen (CN)

(72) Inventors: Luping Cui, Shenzhen (CN); Jiajin Tu, Shenzhen (CN); Hu Liu, Shenzhen (CN); Honghui Yuan, Hangzhou (CN); Heng Liao, Shanghai (CN); Hou Fun Lam, Hong Kong (CN); Bing Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 711 days.

(21) Appl. No.: 16/932,768

(22) Filed: Jul. 19, 2020

(65) Prior Publication Data
US 2020/0364289 A1 Nov. 19, 2020

Related U.S. Application Data

(63) Continuation of application No. PCT/CN2019/071737, filed on Jan. 15, 2019.

(30) Foreign Application Priority Data

Jan. 19, 2018 (CN) .......................... 201810054405.1

(51) Int. Cl.
*G06F 17/16* (2006.01)
*G06T 1/20* (2006.01)
(Continued)

(52) U.S. Cl.
CPC .............. *G06T 1/20* (2013.01); *G06F 17/16* (2013.01); *G06N 3/02* (2013.01); *G06V 10/454* (2022.01); *G06V 10/82* (2022.01)

(58) Field of Classification Search
CPC ...... G06F 17/16; G06F 9/4881; G06F 9/5016; G06F 9/5027; G06N 3/02
(Continued)

(56) References Cited

U.S. PATENT DOCUMENTS

2002/0071600 A1 6/2002 Yamada
2006/0294061 A1 12/2006 Deischinger
(Continued)

FOREIGN PATENT DOCUMENTS

CN 102450017 A 5/2012
CN 102750707 A 10/2012
(Continued)

OTHER PUBLICATIONS

Nickname: Sannianyimeng:"Non-maximum suppression (NMS)", Retrieved from the internet:https://www.cnblogs.com/king-lps/p/8040458.html, Aug. 27, 2020. total 5 pages.
(Continued)

Primary Examiner — Tan V Mai
(74) Attorney, Agent, or Firm — Maier & Maier, PLLC

(57) ABSTRACT

A data processing method and apparatus are disclosed. In various embodiments, R groups of proposal region sequences are obtained. Each group of proposal region sequence includes a plurality of proposal regions. In those embodiments, a VRPAC instruction is invoked to calculate an area of each proposal region in each group of proposal region sequence. For a $j^{th}$ group of proposal region sequence in the R groups of proposal region sequences, a VIOU instruction and a VAADD instruction are invoked to determine j suppression matrices of the $j^{th}$ group of proposal region sequence and determine a suppression vector of the $j^{th}$ group of proposal region sequence based on the j suppression matrices. In those embodiments, an unsuppressed
(Continued)

proposal region is determined based on a suppression vector of each group of proposal region sequence.

12 Claims, 12 Drawing Sheets

(51) Int. Cl.
    *G06N 3/02*     (2006.01)
    *G06V 10/82*     (2022.01)
    *G06V 10/44*     (2022.01)

(58) Field of Classification Search
    USPC .......................................................... 708/520
    See application file for complete search history.

(56) References Cited

U.S. PATENT DOCUMENTS

| | | |
|---|---|---|
| 2015/0278631 A1 | 10/2015 | Bobbitt et al. |
| 2017/0011520 A1 | 1/2017 | Mathew et al. |
| 2017/0300773 A1 | 10/2017 | Poddar et al. |

FOREIGN PATENT DOCUMENTS

| | | |
|---|---|---|
| CN | 104239854 A | 12/2014 |
| CN | 104270635 A | 1/2015 |
| CN | 105654031 A | 6/2016 |
| CN | 106056101 A | 10/2016 |
| CN | 106452769 A | 2/2017 |
| CN | 107463912 A | 12/2017 |
| CN | 109992743 A | 7/2019 |

OTHER PUBLICATIONS

Tuan Q. Pham:"Non-maximum Suppression Using Fewer than Two Comparisons per Pixel", ACIVS 2010, Part I, LNCS 6474, pp. 438-451, 2010.

Liekkas0626:"Non-maximum suppression algorithm", Retrieved from the internet:https://www.cnblogs.com/liekkas0626/p/5219244.html on Aug. 27, 2020. total 6 pages.

Adrian Rosebrock:"(Faster)Non-Maximum Suppression in Python", https://www.pyimagesearch.com/2015/02/16/faster-non-maximum-suppression-python, Feb. 16, 2015, total 47 pages.

Sergey Prokudin et al.: "Learning to Filter Object Detections", GCPR 2017, LNCS 10496, pp. 52-62, 2017.

Oro et al. "Work-Efficient Parallel Non-Maximum Suppression for Embedded GPU Architectures." 2016 IEEE International Conference on Acoustics, Speech and Signal Processing (ICASSP) IEEE, Mar. 20, 2016, pp. 1026-1030, XP032900757.

Fink. "Optimized Implementation of a Feature Detector for Embedded Systems Based on the 'Accelerated Segment Test.'" Bachelor—Thesis, Apr. 17, 2014, 52 pages, XP055769032.

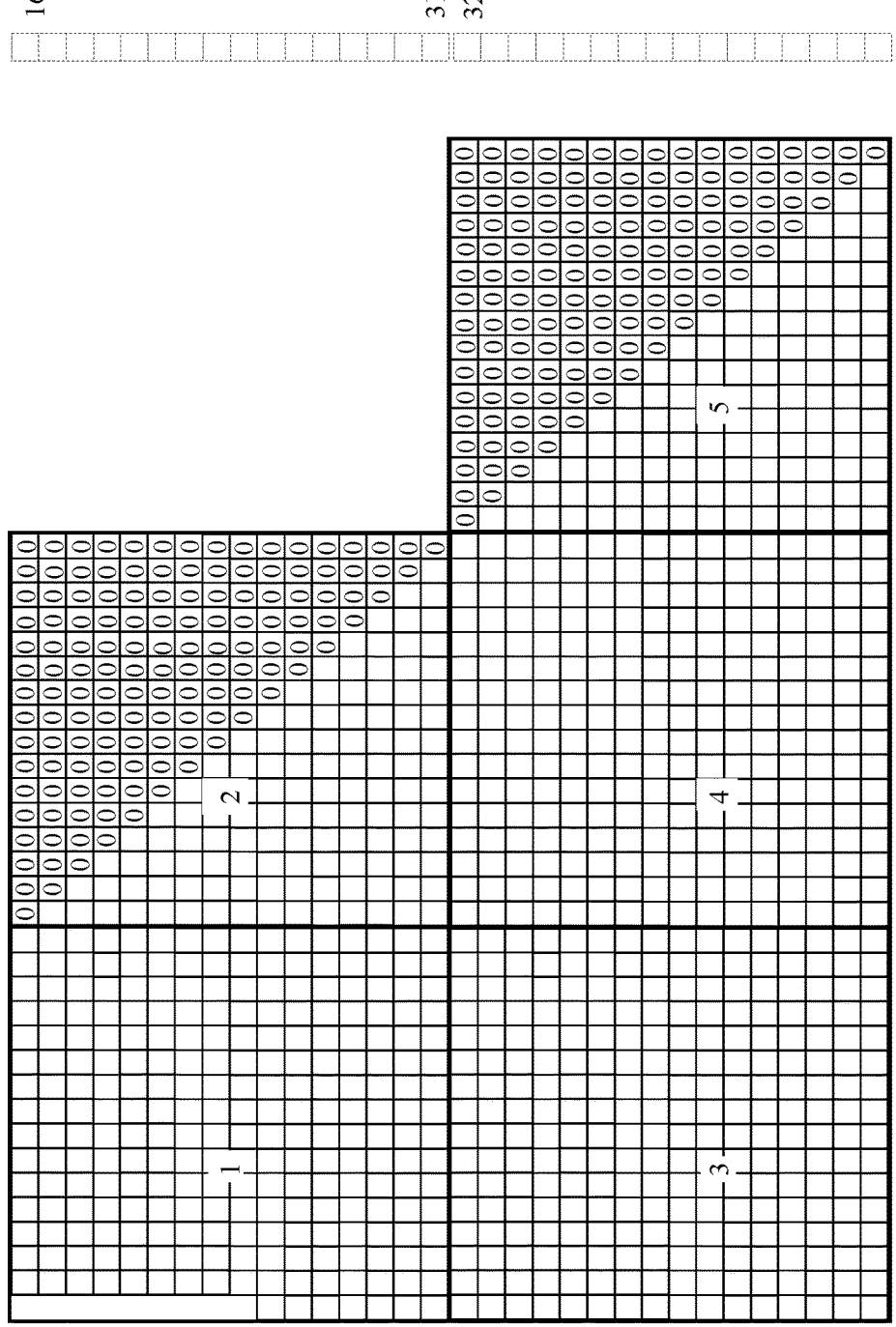

DATA PROCESSING METHOD AND APPARATUS

CROSS-REFERENCE TO RELATED APPLICATIONS

This application is a continuation of International Application No. PCT/CN2019/071737, filed on Jan. 15, 2019, which claims priority to Chinese Patent Application No. 201810054405.1, filed on Jan. 19, 2018. The disclosures of the aforementioned applications are hereby incorporated by reference in their entireties.

TECHNICAL FIELD

This application relates to the field of data processing technologies, and in particular, to a data processing method and apparatus.

BACKGROUND

Object detection and image recognition are important application directions in a convolutional neural network. Non-maximum suppression (NMS) component is indispensable for the object detection, and is responsible for obtaining a unique detection result of a same object. A basic principle of the NMS is comparing an intersection over union proportion of two proposal regions with a threshold. If the proportion is greater than a threshold, a proposal region with a lower score is suppressed. A proposal region is a rectangular box, and is represented by using upper left coordinates (y1, x1) and lower right coordinates (y2, x2). A score of a proposal region reflects a possibility that the proposal region includes an entire object. A higher score indicates a higher possibility that the proposal region includes the entire object.

For the NMS, N proposal regions that have been sorted in descending order of scores are input, and M unsuppressed proposal regions having the highest scores are output.

A central processing unit (CPU) is usually used in NMS calculation. However, because the CPU has a limited parallel computing capability, the CPU can obtain a suppression vector only after cyclically performing calculation a plurality of times. Consequently, a calculation time is long. In addition, there is a solution in which a combination of a CPU and a graphics processing unit (GPU) is used to perform the NMS calculation. The GPU may perform a parallel calculation operation in the NMS calculation, and the CPU may perform a calculation operation other than the parallel calculation. However, due to use of a non-unified architecture, extra communication overheads are required between the CPU and the GPU to complete the NMS calculation. Although a calculation time is much shorter than a time used for calculation performed by only the CPU, the calculation time is still relatively long. In addition, extra power consumption is increased.

SUMMARY

Various embodiments provide a data processing method and apparatus, to shorten a time used in NMS calculation.

According to a first aspect, a data processing method is provided, including:

obtaining R groups of proposal region sequences, where each group of proposal region sequence includes a plurality of proposal regions, and R is a positive integer; invoking a vector region proposal area calculation (VRPAC) instruction to calculate an area of each proposal region in each group of proposal region sequence, where the VRPAC instruction is used to calculate areas of K proposal regions at a single time, and K is associated with a data type; then for a $j^{th}$ group of proposal region sequence in the R groups of proposal region sequences, invoking a vector intersection over union (VIOU) instruction and a vector area add (VAADD) instruction to determine j suppression matrices of the $j^{th}$ group of proposal region sequence and determine a suppression vector of the $j^{th}$ group of proposal region sequence based on the j suppression matrices, where the VIOU instruction is used to calculate an overlapping area between every two proposal regions in two groups of proposal region sequences at a single time, the VAADD instruction is used to calculate an area sum of the every two proposal regions in the two groups of proposal region sequences at a single time, and j is an integer greater than or equal to 1 and less than or equal to R; and finally determining an unsuppressed proposal region based on a suppression vector of each group of proposal region sequence.

The VRPAC instruction is invoked to obtain the area of each proposal region, and the VIOU instruction and the VAADD instruction are invoked to obtain the suppression matrix. Compared with the prior art in which a GPU or a CPU is used in NMS calculation, the method reduces invoked instructions, reduces instruction execution steps, and shortens a time used in the NMS calculation.

In a possible design, the invoking a VIOU instruction and a VAADD instruction to determine j suppression matrices of the $j^{th}$ group of proposal region sequence includes: invoking the VIOU instruction to calculate an overlapping area between every two proposal regions in two adjacent groups of proposal region sequences in a first group of proposal region sequence to the $j^{th}$ group of proposal region sequence and an overlapping area between every two proposal regions in the $j^{th}$ group of proposal region sequence; invoking the VAADD instruction to calculate an area sum of the every two proposal regions in the two adjacent groups of proposal region sequences in the first group of proposal region sequence to the $j^{th}$ group of proposal region sequence and an area sum of the every two proposal regions in the $j^{th}$ group of proposal region sequence; using the area sum of the every two proposal regions in the two adjacent groups of proposal region sequences in the first group of proposal region sequence to the $j^{th}$ group of proposal region sequence and the area sum of the every two proposal regions in the $j^{th}$ group of proposal region sequence as factors; and comparing a factor area sum of the every two proposal regions in the two adjacent groups of proposal region sequences in the first group of proposal region sequence to the $j^{th}$ group of proposal region sequence and a factor area sum of the every two proposal regions in the $j^{th}$ group of proposal region sequence with the overlapping area between the every two proposal regions in the two adjacent groups of proposal region sequences in the first group of proposal region sequence to the $j^{th}$ group of proposal region sequence and the overlapping area between the every two proposal regions in the $j^{th}$ group of proposal region sequence, to obtain the j suppression matrices of the $j^t$ group of proposal region sequence.

The VIOU instruction and the VAADD instruction are invoked to obtain the suppression matrix of each group of proposal region sequence. Compared with the prior art in which the GPU or the CPU is used in the NMS calculation, the method reduces the invoked instructions, reduces the instruction execution steps, reduces a quantity of data loading times, and shortens the time used in the NMS calculation.

In a possible design, the determining a suppression vector of the $j^{th}$ group of proposal region sequence based on the j suppression matrices includes: invoking a region proposal network condition or for non-diagonal suppression matrix (RPN_COR) instruction to perform calculation based on first j−1 suppression matrices in the j suppression matrices, to obtain an intermediate suppression vector result; and invoking a region proposal network diagonal condition or for non-diagonal suppression matrix (RPN_COR_DIAG) instruction to perform calculation based on the $j^{th}$ suppression matrix in the j suppression matrices, and performing an or operation on a calculation result and the intermediate suppression vector result to obtain the suppression vector of the $j^{th}$ group of proposal region sequence.

The RPN_COR instruction and the RPN_COR_DIAG instruction are combined to perform calculation based on the suppression matrix to obtain the suppression vector. This reduces a quantity of calculation times, and further shortens the time used in the NMS calculation.

In a possible design, the RPN_COR_DIAG instruction is used to perform calculation based on a diagonal matrix block of a suppression matrix to obtain a suppression vector, and the RPN_COR instruction is used to perform calculation based on a non-diagonal matrix block of the suppression matrix to obtain an intermediate suppression vector result.

According to a second aspect, a data processing apparatus is provided, including a communications unit and a processing unit, where the communications unit is configured to obtain R groups of proposal region sequences, where each group of proposal region sequence includes a plurality of proposal regions, and R is a positive integer; and the processing unit is configured to: invoke a VRPAC instruction to calculate an area of each proposal region in each group of proposal region sequence, where the VRPAC instruction is used to calculate areas of K proposal regions at a single time, and K is associated with a data type; for a $j^{th}$ group of proposal region sequence in the R groups of proposal region sequences, invoke a VIOU instruction and a VAADD instruction to determine j suppression matrices of the $j^{th}$ group of proposal region sequence and determine a suppression vector of the $j^{th}$ group of proposal region sequence based on the j suppression matrices, where the VIOU instruction is used to calculate an overlapping area between every two proposal regions in two groups of proposal region sequences at a single time, the VAADD instruction is used to calculate an area sum of the every two proposal regions in the two groups of proposal region sequences at a single time, and j is an integer greater than or equal to 1 and less than or equal to R; and determine an unsuppressed proposal region based on a suppression vector of each group of proposal region sequence.

In a possible design, when invoking the VIOU instruction and the VAADD instruction to determine the j suppression matrices of the $j^{th}$ group of proposal region sequence, the processing unit is specifically configured to:

invoke the VIOU instruction to calculate an overlapping area between every two proposal regions in two adjacent groups of proposal region sequences in a first group of proposal region sequence to the $j^{th}$ group of proposal region sequence and an overlapping area between every two proposal regions in the $j^{th}$ group of proposal region sequence;

invoke the VAADD instruction to calculate an area sum of the every two proposal regions in the two adjacent groups of proposal region sequences in the first group of proposal region sequence to the $j^{th}$ group of proposal region sequence and an area sum of the every two proposal regions in the $j^{th}$ group of proposal region sequence;

use the area sum of the every two proposal regions in the two adjacent groups of proposal region sequences in the first group of proposal region sequence to the $j^{th}$ group of proposal region sequence and the area sum of the every two proposal regions in the $j^{th}$ group of proposal region sequence as factors; and compare a factor area sum of the every two proposal regions in the two adjacent groups of proposal region sequences in the first group of proposal region sequence to the $j^{th}$ group of proposal region sequence and a factor area sum of the every two proposal regions in the $j^{th}$ group of proposal region sequence with the overlapping area between the every two proposal regions in the two adjacent groups of proposal region sequences in the first group of proposal region sequence to the $j^{th}$ group of proposal region sequence and the overlapping area between the every two proposal regions in the $j^{th}$ group of proposal region sequence, to obtain the j suppression matrices of the $j^{th}$ group of proposal region sequence.

In a possible design, when determining the suppression vector of the $j^{th}$ group of proposal region sequence based on the j suppression matrices, the processing unit is specifically configured to:

invoke an RPN_COR instruction to perform calculation based on first j−1 suppression matrices in the j suppression matrices, to obtain an intermediate suppression vector result; and invoke an RPN_COR_DIAG instruction to perform calculation based on the $j^{th}$ suppression matrix in the j suppression matrices, and perform an or operation on a calculation result and the intermediate suppression vector result to obtain the suppression vector of the $j^{th}$ group of proposal region sequence.

In a possible design, the RPN_COR_DIAG instruction is used to perform calculation based on a diagonal matrix block of a suppression matrix to obtain a suppression vector, and the RPN_COR instruction is used to perform calculation based on a non-diagonal matrix block of the suppression matrix to obtain an intermediate suppression vector result.

According to a third aspect, a data reading apparatus is provided, including a processor and a memory, where the memory stores a computer executable instruction; the processor and the memory are connected through a bus; and when the apparatus runs, the processor executes the computer executable instruction stored in the memory, and the apparatus is enabled to perform the method in any one of the first aspect.

According to a fourth aspect, a chip is provided, including a processing unit and a communications unit, where the processing unit may be, for example, a processor, and the communications unit may be, for example, an input/output interface, a pin, or a circuit. The processing unit may execute a computer executable instruction stored in a storage unit, to perform the data processing method in any one of the first aspect. Optionally, the storage unit is a storage unit in the chip, such as a register or a buffer; or the storage unit may be a storage unit in a terminal device but outside the chip, such as a read-only memory, another type of static storage device capable of storing static information and instructions, or a random access memory.

According to a fifth aspect, a computer-readable storage medium is provided, including a computer-readable instruction, where when a computer reads and executes the computer-readable instruction, the computer is enabled to perform the method in any one of the first aspect.

According to a sixth aspect, a computer program product is provided, including a computer-readable instruction, where when a computer reads and executes the computer-readable instruction, the computer is enabled to perform the method in any one of the first aspect.

BRIEF DESCRIPTION OF DRAWINGS

FIG. 9A and FIG. 9B are a schematic diagram of executing a combination of an RPN_COR instruction and an RPN_COR_DIAG instruction according to this application;

DESCRIPTION OF EMBODIMENTS

Figure 1:
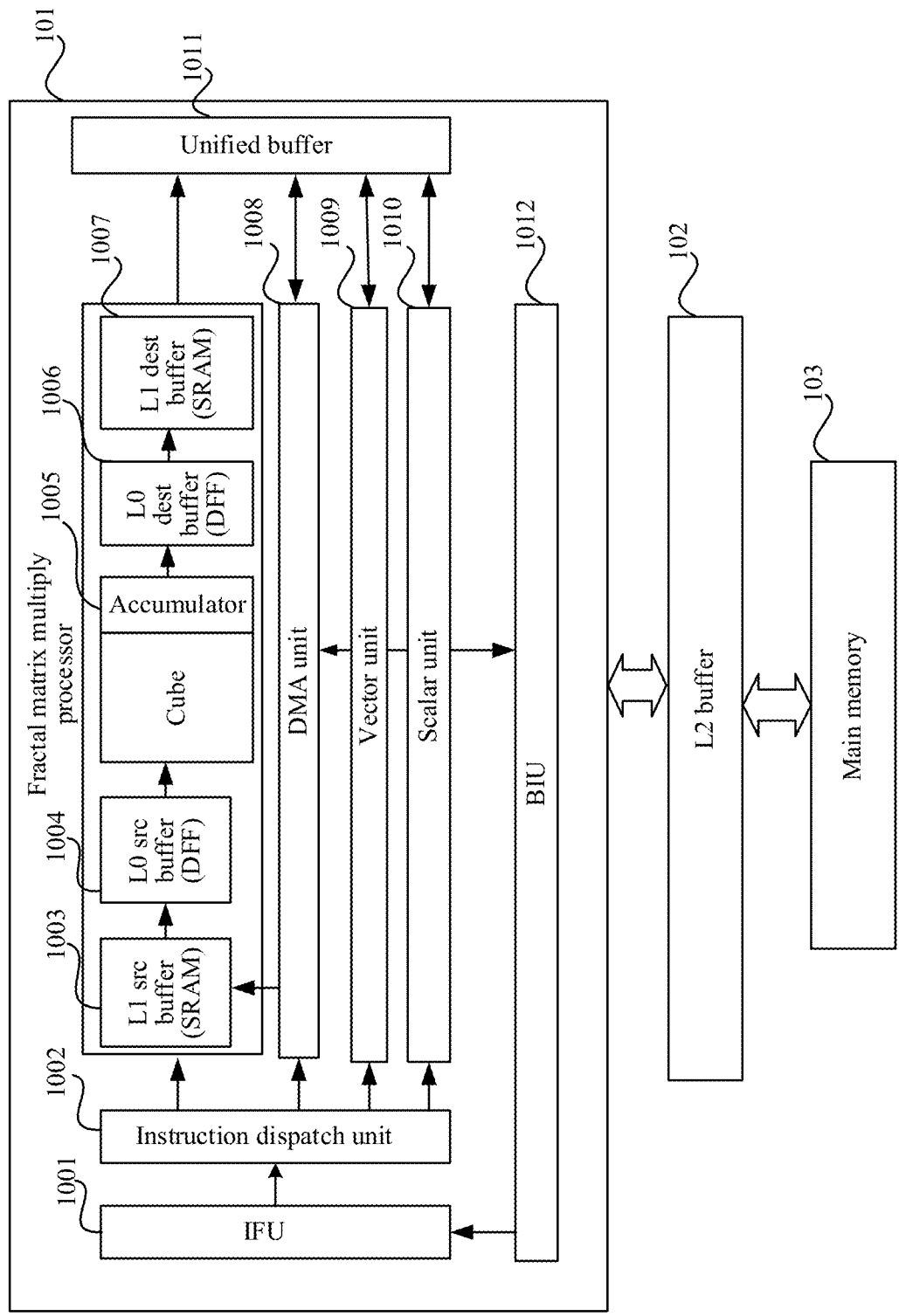
FIG. 1 is a schematic diagram of a system architecture according to this application.

Various embodiments provide a data processing method, and the method may be applied to a system architecture shown in FIG. 1. FIG. 1 shows a possible system architecture according to an embodiment of this application. As shown in FIG. 1, the system architecture includes a fractal matrix multiply processor 101, a level 2 buffer 102, and a main memory 103.

The fractal matrix multiply processor 101 includes an instruction fetch unit (IFU) 1001, an instruction dispatch unit 1002, a level 1 source operand buffer (L1 src Buffer (static random access memory (SRAM))) (set up by using an SRAM) 1003, a level 0 source operand buffer (L0 src Buffer (DFF)) (set up by using a register) 1004, an accumulator 1005, a level 0 destination operand buffer (L0 Dest Buffer (DFF)) 1006, a level 1 destination operand buffer (L1 Dest Buffer (SRAM)) 1007, a direct memory access unit (DMA Unit) 1008, a vector unit 1009, a scalar unit 1010, a unified buffer (UB) 1011, and a bus interface unit (BIU) 1012. The L1 src buffer (SRAM) 1003, the L0 src buffer (DFF) 1004, the accumulator 1005, the L0 dest buffer (DFF) 1006, and the L1 dest buffer (SRAM) 1007 may form a fractal matrix multiply unit. The IFU 1001 may obtain an instruction from the main memory 103 by using the BIU 1012, and decode the instruction and control an execution procedure. The instruction dispatch unit 1002 may submit a corresponding type instruction to four pipeline units. The instruction dispatch unit 1002 may control order-preserving execution between the four pipelines units according to a regular rule. The pipeline units are classified into two types: asynchronous execution and synchronous execution. All types support order-preserving transmission. A difference lies in that execution of instructions by an asynchronous execution unit ends asynchronously and execution of instructions by a synchronous execution unit ends synchronously. The scalar unit 1010 is a synchronous execution unit, and the fractal matrix multiply processor 101, the DMA unit 1008, and the vector unit 1009 are asynchronous execution units. All execution units may read/write share data by using the unified buffer 1011. The fractal matrix multiply unit includes an L1 dedicated buffer and an L0 dedicated buffers. The L1 buffer and the unified buffer 1011 exchange data with external storage space by using the DMA unit 1008. The external storage space includes a plurality of levels of storage units. For example, a capacity of the unified buffer 1011 is 256 KB, and the unified buffer is implemented by 64 storage bodies. Each storage body is 32 B in width. In the unified buffer 1011, sorted proposal regions may be stored in a manner shown in Table 1.

TABLE 1

| Bit index | 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|---|
| UB address off 0 | | | | | y2[0] | x2[0] | y1[0] | x1[0] | | | | | y2[0] | x2[0] | y1[0] | x1[0] |
| UB address off 1 | | | | | y2[1] | x2[1] | y1[1] | x1[1] | | | | | y2[1] | x2[1] | y1[1] | x1[1] |
| UB address off 2 | | | | | y2[2] | x2[2] | y1[2] | x1[2] | | | | | y2[2] | x2[2] | y1[2] | x1[2] |
| UB address off 3 | | | | | y2[3] | x2[3] | y1[3] | x1[3] | | | | | y2[3] | x2[3] | y1[3] | x1[3] |
| UB address off 4 | | | | | y2[4] | x2[4] | y1[4] | x1[4] | | | | | y2[4] | x2[4] | y1[4] | x1[4] |
| UB address off 5 | | | | | y2[5] | x2[5] | y1[5] | x1[5] | | | | | y2[5] | x2[5] | y1[5] | x1[5] |
| UB address off 6 | | | | | y2[6] | x2[6] | y1[6] | x1[6] | | | | | y2[6] | x2[6] | y1[6] | x1[6] |
| UB address off 7 | | | | | y2[7] | x2[7] | y1[7] | x1[7] | | | | | y2[7] | x2[7] | y1[7] | x1[7] |

Figure 2:
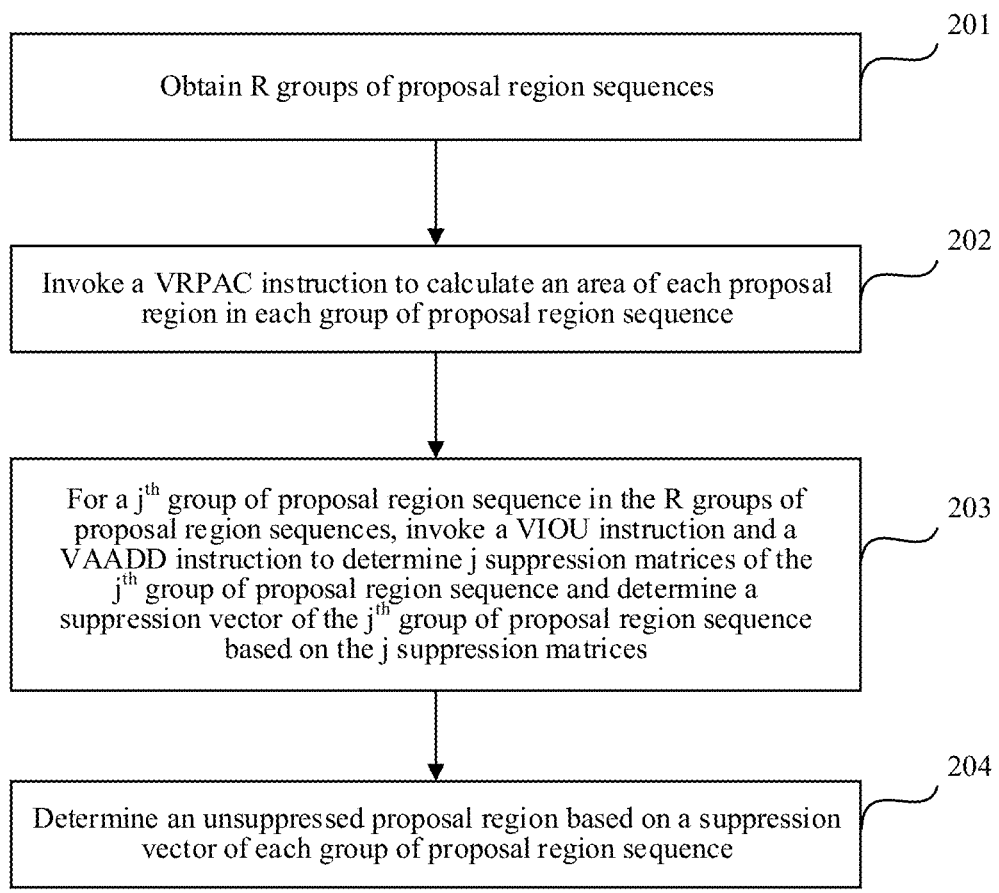
FIG. 2 is a schematic flowchart of a data processing method according to this application.

Based on the foregoing description, FIG. 2 shows an example of a procedure of a data processing method according to this application. The data processing method may be applied to the field of image processing, and the procedure may be performed by the fractal matrix multiply processor.

As shown in FIG. 2, the procedure specifically includes the following steps.

Step 201: Obtain R groups of proposal region sequences.

The R groups of proposal region sequences are to-be-input data, and are sorted proposal region sequences. Each group of proposal region sequence may include a plurality of proposal regions, and a quantity of proposal regions included in each group of proposal region sequence is related to a quantity of bits of an input data type. Data types may include an 8-bit unsigned integer (u8), an 8-bit signed integer (s8), a 16-bit floating point (fp16) number, and a 32-bit floating point (fp32) number. For example, it is assumed that the data type is fp16, and N proposal regions are input. In this case, N is a multiple of 16, N=16×R, and R is a quantity of groups of the proposal regions. The R groups of proposal region sequences may be stored in a UB according to the storage address shown in Table 1. In this application, the data types are not limited to the foregoing several types, and are merely used as examples.

Step 202: Invoke a VRPAC instruction to calculate an area of each proposal region in each group of proposal region sequence.

In a process of non-maximum suppression (NMS) calculation, first, the VRPAC instruction needs to be invoked to calculate the area of each proposal region in each group of proposal region sequence. The VRPAC instruction is used to calculate areas of K proposal regions at a single time, where K is associated with a quantity of bits of a data type. To be specific, a value of K may be the same as the quantity of bits of the data type. For example, when the data type is fp16, the VRPAC instruction may be used to calculate areas of 16 proposal regions at a single time. A value of K may be 8, 16, 32, or the like. The VRPAC instruction may support a duplication mode. To be specific, calculating areas of a plurality of groups of proposal regions are automatically completed by setting a quantity of repetition times. The VRPAC instruction may be implemented by reusing existing M summator resources and (M/4) multiplier resources. The VRPAC instruction may be used to complete a calculation task in one beat, two beats, or three beats based on different target frequencies. The VRPAC instruction may be used to determine whether the VRPAC instruction is executed in a full pipeline manner or in a non-full pipeline manner based on a quantity of resources of summators and multipliers in a vector unit.

Figure 3:
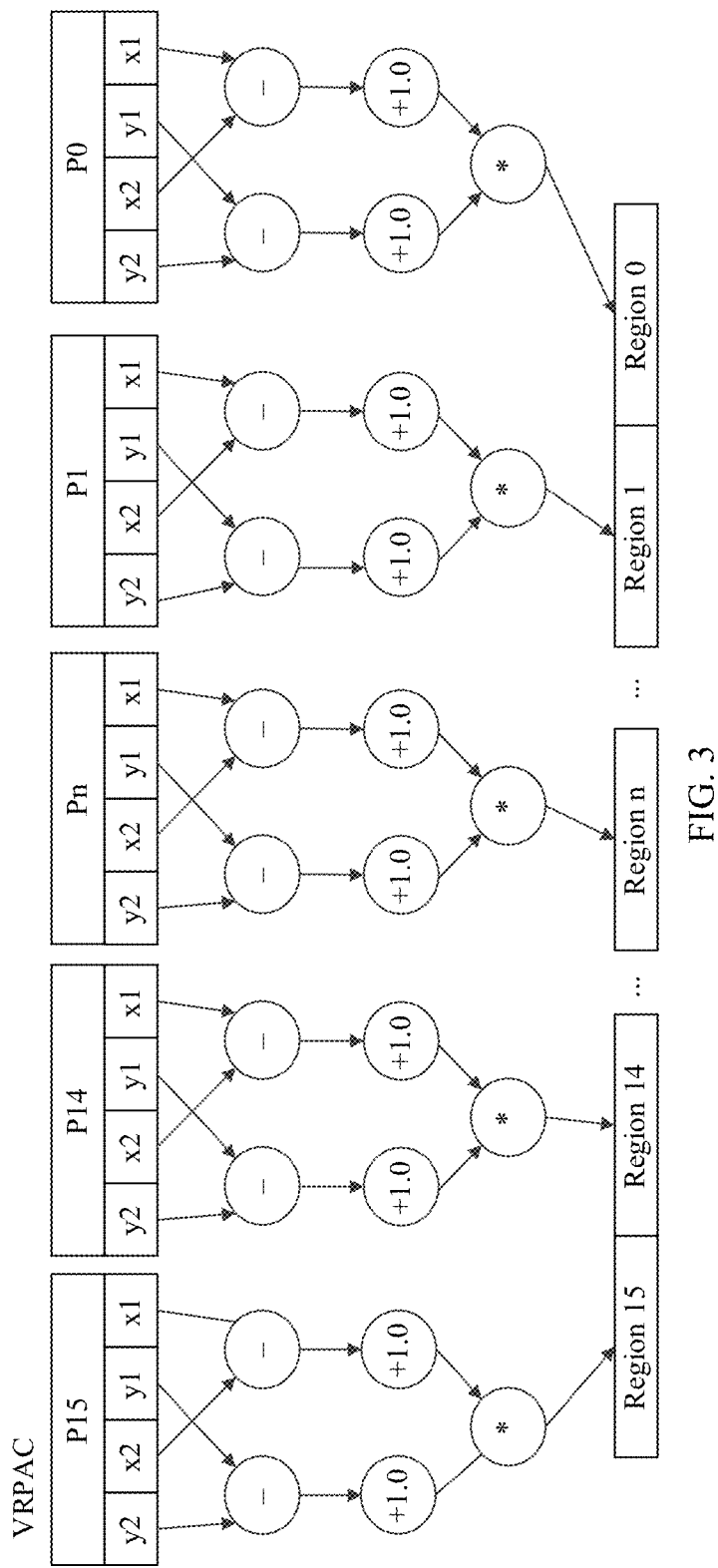
FIG. 3 is a schematic diagram of executing a VRPAC instruction according to this application.

For example, in a structural diagram shown in FIG. 3, the value of K is 16, the data type is fp16, 64 fp16 summators and 16 fp16 multipliers in the vector unit are reused. The VRPAC instruction may be executed in the full pipeline manner. P0 to P15 are proposal regions. Areas of 16 proposal regions are finally output after calculation by using the summators and the multipliers.

It can be seen from FIG. 3 that, to calculate an area of a proposal region, two subtraction operations, two addition operations, and one multiplication operation need to be performed. To be specific, the VRPAC instruction is invoked once and K×R results can be obtained at a time. In other words, the operation of calculating an area of a proposal region is repeated R times, but the instruction is invoked only once. However, currently, when a CPU is used to calculate areas of a plurality of proposal regions, five instructions need to be sequentially executed in each cycle. The first instruction is used to calculate horizontal coordinates (x2−x1) of a proposal region, to obtain an intermediate result res_tmp0. The second instruction is used to calculate a sum of res_tmp0 and 1, to obtain an intermediate result res_tmp1. The third instruction is used to calculate vertical coordinates (y2−y1), to obtain an intermediate result res_tmp2. The fourth instruction is used to calculate a sum of res_tmp2 and 1, to obtain an intermediate result res_tmp3. The fifth instruction is used to calculate a product of res_tmp1 and res_tmp3, to obtain a value of the area of the proposal region. In this calculation manner, in terms of performance, there is no data for res_tmp1 and res_tmp3 to depend on; however, res_tmp1 and res_tmp3 need to be obtained sequentially. Consequently, performance is degraded. In addition, res_tmp1 is obtained based on res_tmp0 (likewise, res_tmp3 is obtained based on res_tmp2). res_tmp1 may be calculated only after res_tmp0 is written back to a register. A modern processor usually reduces, in a bypass manner, a performance loss caused by data dependency. However, both a floating point addition operation and a floating point multiplication operation usually need be completed in a plurality of beats. Consequently, a problem that not all performance losses can be eliminated may arise. In terms of power consumption caused during storage access, the five instructions need to occupy storage space for the five instructions, and each instruction needs to be fully fetched, decoded, executed, and written back to the register. Consequently, a power efficiency ratio is low.

When a GPU is used to calculate an area of a proposal region, the GPU usually assigns different threads to calculate areas of a plurality of proposal regions, to improve a degree of parallelism. A calculation process of a single thread is similar to that of the CPU. Each thread may also face the same performance, power consumption, and storage problems as the CPU. The GPU may hide a calculation loss by switching different threads. However, this requires a large quantity of extra register resources.

However, according to the present disclosure, only the VRPAC instruction is used in this case; and in actual implementation, there are three basic steps: Step 1: Obtain res_tmp0 and res_tmp2 at the same time. Step 2: Obtain res_tmp1 and res_tmp3 at the same time. Step 3: Obtain a final result. In terms of performance, this manner includes two less basic steps than the foregoing two manners, the steps are all performed by hardware in a pipeline manner, and there is no potential performance loss problem. Therefore, a calculation time is shortened. In terms of power consumption caused during storage access, only one instruction that supports the duplication mode can be used to calculate areas of R×K proposal regions (R is a quantity of repetition times, and K is a degree of parallelism for one repetition). During execution, the instruction is fetched and decoded only once, and only the final result is written back to the UB. Therefore, extra power consumption is minimized. A power efficiency ratio is higher than those for the GPU and the CPU. Therefore, a large amount of calculation time is saved.

Step 203: For a $j^{th}$ group of proposal region sequence in the R groups of proposal region sequences, invoke a VIOU instruction and a VAADD instruction to determine j suppression matrices of the $j^{th}$ group of proposal region sequence and determine a suppression vector of the j group of proposal region sequence based on the j suppression matrices.

According to the present disclosure, the VIOU instruction may be used to calculate an overlapping area between every two proposal regions in two groups of proposal region sequences at a single time. For example, if each group has K proposal regions, K×K overlapping areas are calculated. The VIOU instruction may also support a duplication mode, and may be used to automatically calculate the overlapping areas of a plurality of groups of proposal regions by setting a quantity of repetition times. M comparators, M summators, and (M/4) multipliers that are currently used are reused to complete the calculation in one beat, two beats, or three beats based on different target frequencies. A quantity of resources of comparators, summators, and multipliers in the vector unit may be used to determine whether the VIOU instruction is executed in a full pipeline manner or in a non-full pipeline manner.

Figure 4:
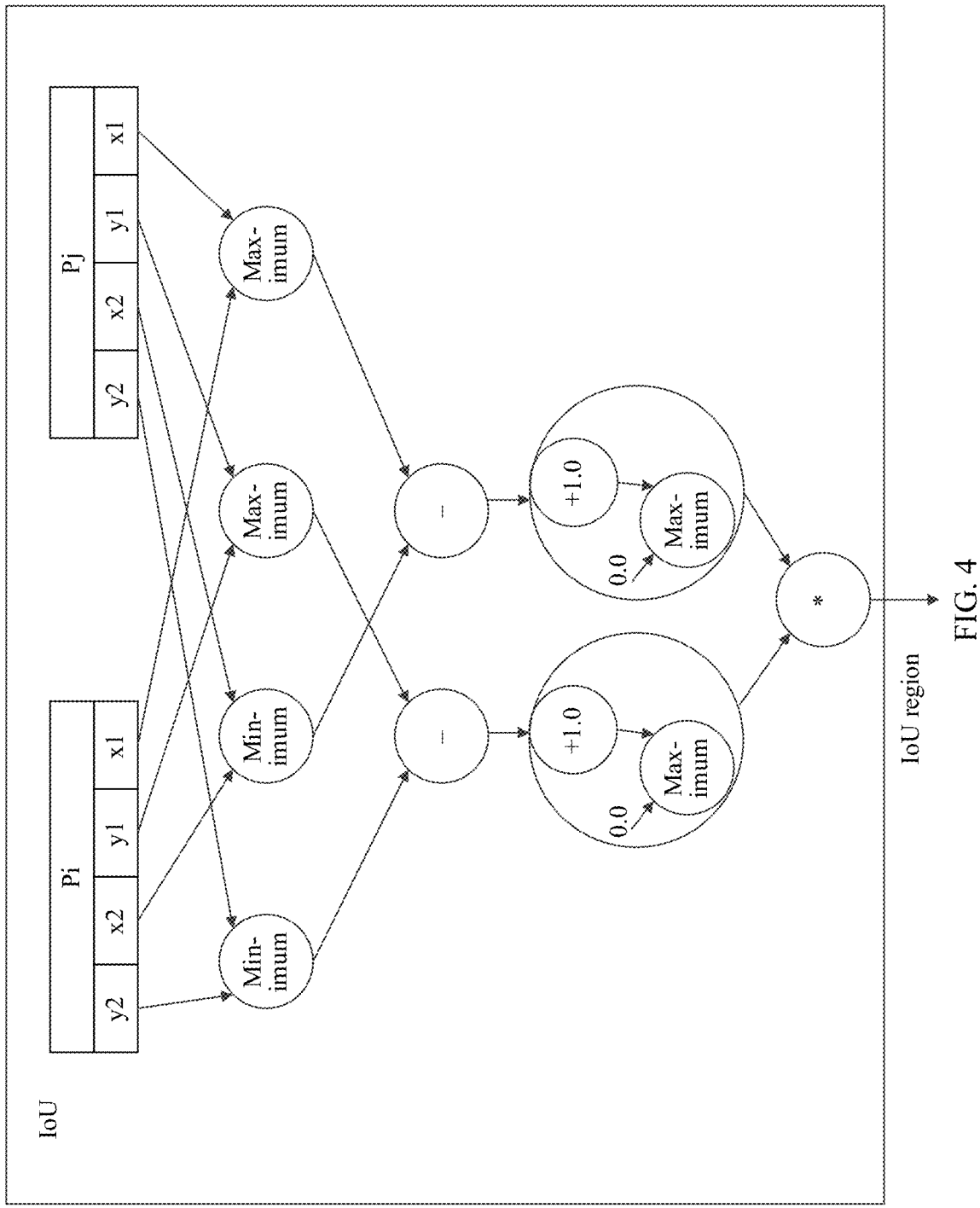
FIG. 4 is a schematic diagram of executing a VIOU instruction according to this application.
Figure 5:
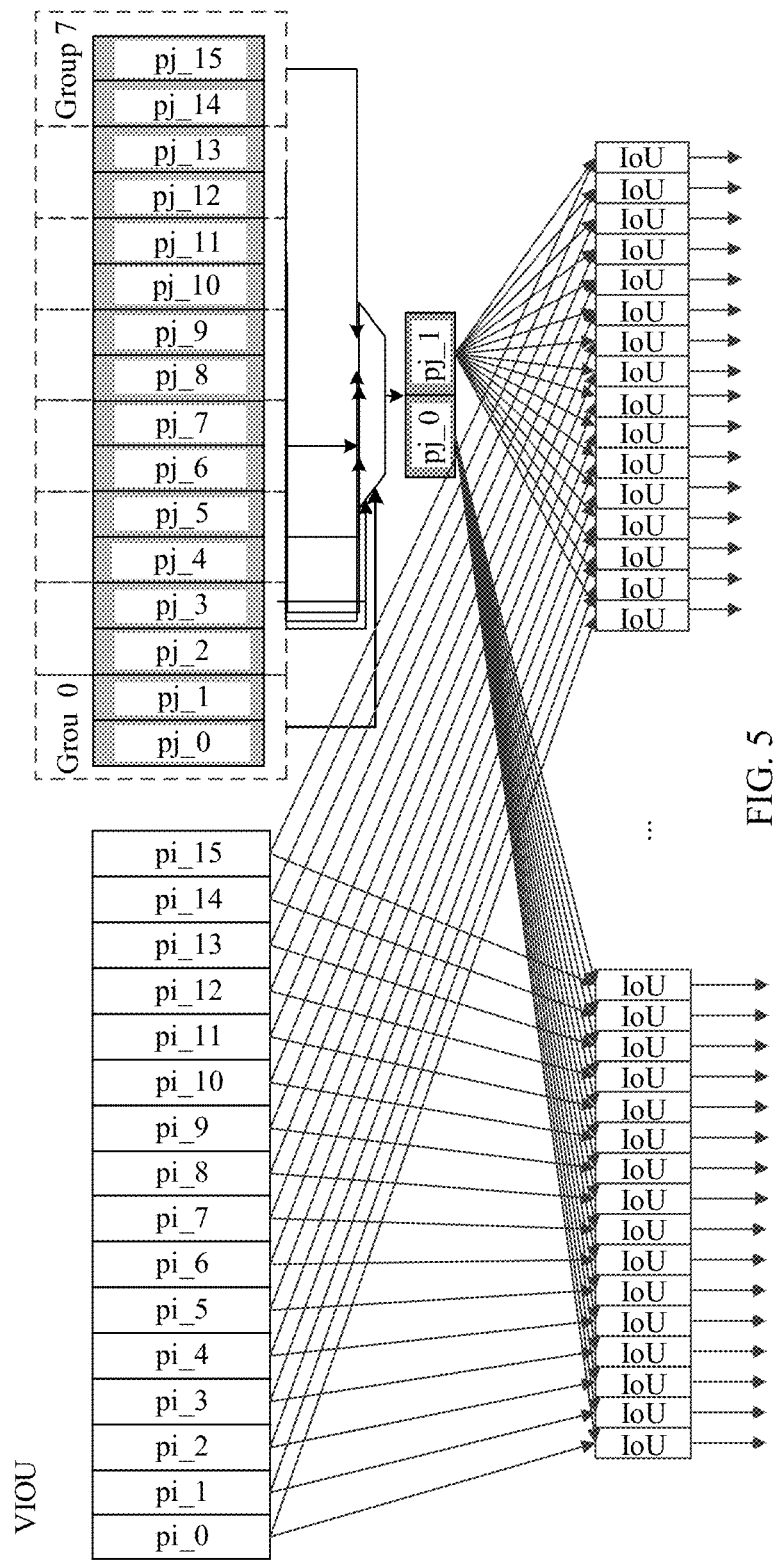
FIG. 5 is a schematic diagram of executing a VIOU instruction according to this application.

For example, as shown in FIG. 4, calculation of a single overlapping area may be completed by performing four comparison operation, two subtraction operations, two addition and comparison operations, and one multiplication operation on coordinates of two proposal regions. When K is 16, and M is 128, hardware shown in FIG. 5 may be used to implement the calculation.

In an existing solution in which the CPU or the GPU is used to calculate an overlapping area between proposal regions, if one thread is used, 11 instructions are required to complete the calculation. In other words, the calculation is implemented in 11 steps. However, if the VIOU instruction is used, only four basic steps are required: Step 1: Obtain xx1, yy1, xx2, and yy2 at the same time. Step 2: Obtain res_tmp0 and res_tmp2 at the same time. Step 3: Obtain res_tmp1 and res_tmp3 at the same time, and obtain res_tmp4 and res_tmp5 because fewer logic circuits are required when res_tmp4 and res_tmp5 are compared with 0. Step 4: Obtain a final result, namely, the overlapping area that needs to be calculated. In terms of performance, the manner for which the VIOU instruction is used includes seven less basic steps than the existing manner for which the CPU or the GPU is used, the steps are all performed by hardware in a pipeline manner, and there is no potential performance bubble problem. Because calculation steps are reduced, a calculation time is shortened. In terms of power consumption caused during storage access, only one instruction that supports the duplication mode can be used to calculate overlapping areas of R×K proposal regions (R is a quantity of repetition times, and K is a degree of parallelism for one repetition, namely, several proposal regions are calculated at a time). During execution, the VIOU instruction is fetched and decoded only once, and only the final result is written back to the UB. Therefore, extra power consumption is minimized. A power efficiency ratio is higher than those for the GPU and the CPU.

The VAADD instruction may be used to calculate an area sum of every two proposal regions in two groups of proposal region sequences at a single time. For example, if each group has K proposal regions, area sums of every two proposal regions in K×K proposal regions are calculated. The VAADD instruction supports a duplication mode, and is used to automatically calculate an area sum of a plurality of groups of proposal regions by setting a quantity of repetition times. Existing M summators may be reused to complete the calculation in one beat, two beats, or three beats based on different target frequencies. A quantity of resources of summators in the vector unit may be used to determine whether the instruction is executed in a full pipeline manner or in a non-full pipeline manner.

Figure 6:
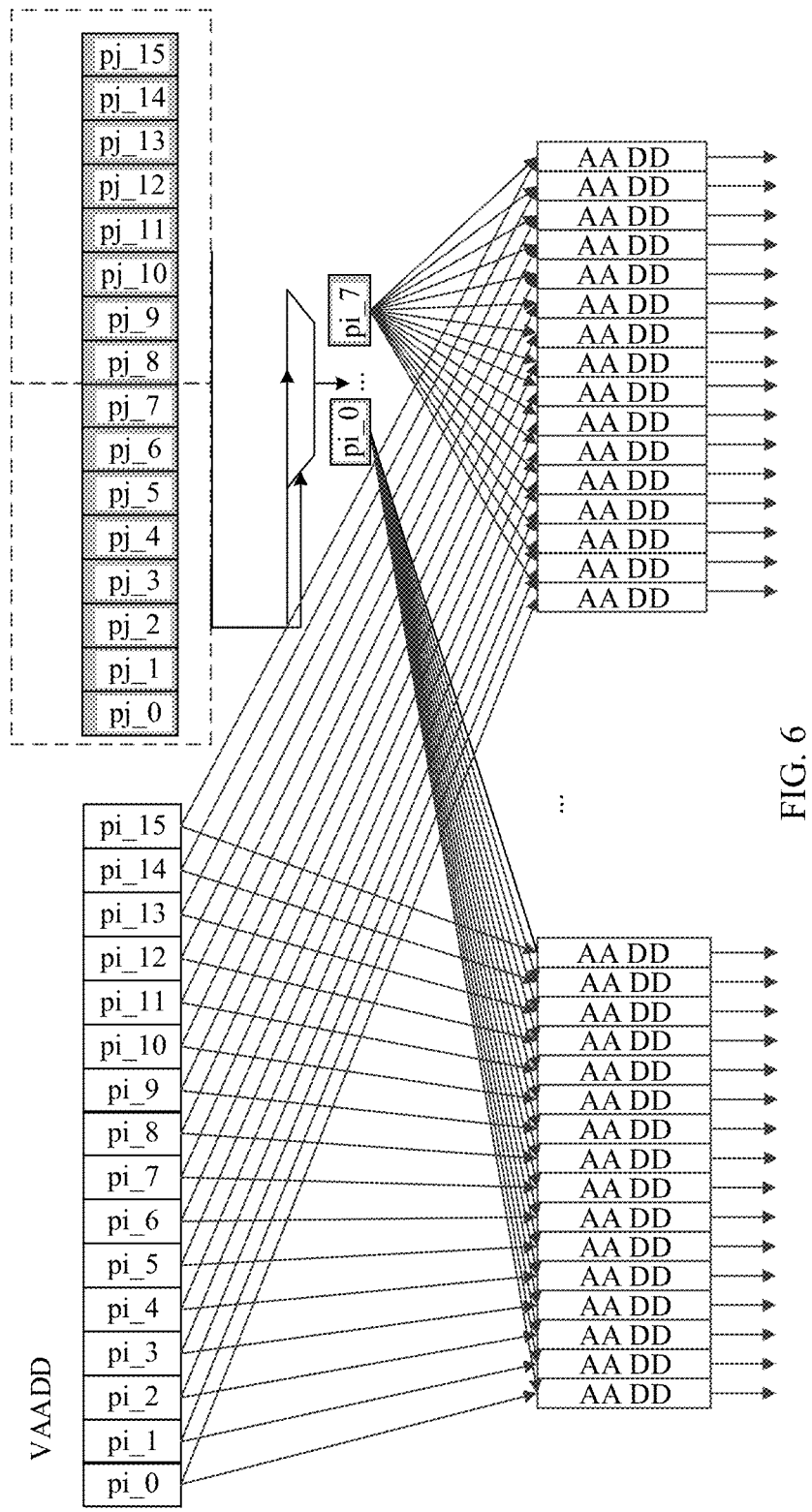
FIG. 6 is a schematic diagram of executing a VAADD instruction according to this application.

As shown in FIG. 6, when a value of K is 16 and a value of M is 128, a hardware structure shown in FIG. 6 may be used to implement the calculation. 256 results may be generated every two beats, and the VAADD instruction is executed in the non-full pipeline manner. From a perspective of a calculation process of the VAADD instruction, there is only an addition step. Because the area sum of every two of two groups of proposal regions needs to be calculated, orders of accessing the UB may be reduced by using the VAADD instruction. The CPU and the GPU need to load data of a same proposal region a plurality of times to achieve a same effect. Therefore, a calculation time is also shortened.

Based on the VIOU instruction and the VAADD instruction, the determining the j suppression matrices of the $j^{th}$ group of proposal region sequence may be specifically: invoking the VIOU instruction to calculate an overlapping area between every two proposal regions in two adjacent groups of proposal region sequences in a first group of proposal region sequence to the $j^{th}$ group of proposal region sequence and an overlapping area between every two proposal regions in the $j^{th}$ group of proposal region sequence; invoking the VAADD instruction to calculate an area sum of the every two proposal regions in the two adjacent groups of proposal region sequences in the first group of proposal region sequence to the $j^{th}$ group of proposal region sequence and an area sum of the every two proposal regions in the $j^{th}$ group of proposal region sequence; then using the area sum of the every two proposal regions in the two adjacent groups of proposal region sequences in the first group of proposal region sequence to the $j^{th}$ group of proposal region sequence and the area sum of the every two proposal regions in the $j^{th}$ group of proposal region sequence as factors; and finally comparing a factor area sum of the every two proposal regions in the two adjacent groups of proposal region sequences in the first group of proposal region sequence to the $j^{th}$ group of proposal region sequence and a factor area sum of the every two proposal regions in the $j^{th}$ group of proposal region sequence with the overlapping area between the every two proposal regions in the two adjacent groups of proposal region sequences in the first group of proposal region sequence to the $j^{th}$ group of proposal region sequence and the overlapping area between the every two proposal regions in the $j^{th}$ group of proposal region sequence, to obtain the j suppression matrices of the $j^{th}$ group of proposal region sequence, where j may be an integer greater than or equal to 1 and less than or equal to R.

For example, when a value of j is 3, first, the VIOU instruction is invoked, a quantity of repetition times is set to 3, and an overlapping area every two proposal regions in a first group of proposal region sequence and a second group of proposal region sequence, an overlapping area between every two proposal regions in the second group of proposal region sequence and a third group of proposal region sequence, and an overlapping area between every two proposal regions in the third group of proposal region sequence are calculated. The VAADD instruction is invoked, a quantity of repetition times is set to 3, and an area sum of the every two proposal regions in the first group of proposal region sequence and the second group of proposal region sequence, an area sum of the every two proposal regions in the second group of proposal region sequence and the third group of proposal region sequence, and an area sum of the every two proposal regions in the third group of proposal region sequence are calculated. Then, the calculated area sums are used as factors. To be specific, the obtained area sums are multiplied by a parameter factor a, where the parameter factor may be set based on experience. After the area sums are used as factors, the factor area sums may be compared with the calculated overlapping areas, so that three suppression matrices of the third group of proposal region sequence may be obtained. A finally obtained suppression matrix is an N×N matrix (N is a total quantity of proposal regions), and values of elements on and above a diagonal line of the matrix are all 0.

It should be noted that, to obtain the suppression matrix, when the VRPAC instruction is used to load, from a main memory, data that needs to be calculated, the data needs to be loaded R*K times in one calculation, where R is a quantity of groups of proposal region sequences, and K is a quantity of proposal regions included in each group of proposal region sequence. When the VIOU instruction or the VAADD instruction is used to load data that needs to be calculated, the data needs to be loaded $$\frac{2*R^2*2*K}{2}$$

times, that is, $R^2*2*K$ times, in one calculation. However, in the existing solution in which the CPU or the GPU is used, to obtain the suppression matrix, the data needs to be loaded $$\frac{2*(R*K)^2}{2}$$

times, that is, $(R*K)^2$ times, in one calculation by invoking each instruction. The quantity of data loading times for the case in which the CPU or the GPU is used for calculation is compared with the quantity of data loading times for the case in which the VIOU instruction or the VAADD instruction is used in this application, to obtain that the quantity of data loading times in one calculation for the case in which the CPU or the GPU is used is $$\frac{K}{2}$$

times greater than the quantity of data loading times in one calculation for the case in which the VIOU instruction or the VAADD instruction is used. For example, when only one group of proposal region sequence is loaded, and the group of proposal region sequence includes 16 proposal regions, a quantity of data loading times for the case in which the CPU or the GPU is used is 8 times greater than a quantity of data loading times for the case in which the VIOU instruction or the VAADD instruction is used. For another example, when 64 groups of proposal region sequences are loaded, and each group of proposal region sequence includes 16 proposal regions, in this application, a quantity of data loading times for the case in which the VIOU instruction or the VAADD instruction is used is $64^2*2*16=131072$ times, while in the existing technical solution, a quantity of data loading times for the case in which an instruction is used is $(64*16)^2=1048576$ times, and a difference between the two quantities of data loading times is 917,504. More loaded data results in a larger difference. It is clearly that the technical solution of this application can greatly reduce the quantity of data loading times, and save a calculation time. In addition, steps for calculation by using the CPU or the GPU are more than those in the technical solution of this application. Therefore, a difference between the quantities of data loading times is further increased. Therefore, compared with the existing NMS calculation solution, the technical solution provided in this application reduces the quantity of data loading times, correspondingly reduces a quantity of main memory access times, shortens a calculation time, and reduces extra power consumption.

After the j suppression matrices of the $j^{th}$ group of proposal region sequence are obtained, the suppression vector of the $j^{th}$ group of proposal region sequence may be determined based on the j suppression matrices. Specifically, a region proposal network condition or for non-diagonal suppression matrix (RPN_COR) instruction may be invoked to perform calculation based on first j−1 suppression matrices in the j suppression matrices, to obtain an intermediate suppression vector result, then a region proposal network diagonal condition or for non-diagonal suppression matrix (RPN_COR_DIAG) instruction may be invoked to perform calculation based on the $j^{th}$ suppression matrix in the j suppression matrices, and an or operation is performed on a calculation result and the intermediate suppression vector result to obtain the suppression vector of the $j^{th}$ group of proposal region sequence.

The RPN_COR_DIAG instruction may be used to perform calculation based on a diagonal matrix block of the suppression matrix to obtain a suppression vector. To be specific, suppression vectors (K×1) may be calculated based on diagonal matrix blocks (K×K) of the suppression matrix. This can be implemented in one beat, two beats, or a plurality of beats based on different target frequencies, and the RPN_COR_DIAG instruction may be executed in a full pipeline manner. The RPN_COR_DIAG instruction has two inputs: One is a diagonal matrix block, and the other is a special register for storing an intermediate result. In a process of calculating the suppressing vector, a result with a lower score depends on a result with a higher score. To be specific, the $i^{th}$ component is calculated based on calculation results of components 0 to i−1. If a component of a suppression vector is 1, a suppression relationship by the proposal region on a subsequent proposal region with a lower score needs to be canceled. A previously calculated intermediate result is placed in the special register RPN_COR_IR, and a bitwise or operation is performed on the intermediate result and a currently obtained result to obtain final suppression vector results of the 16 proposal regions.

Figure 7:
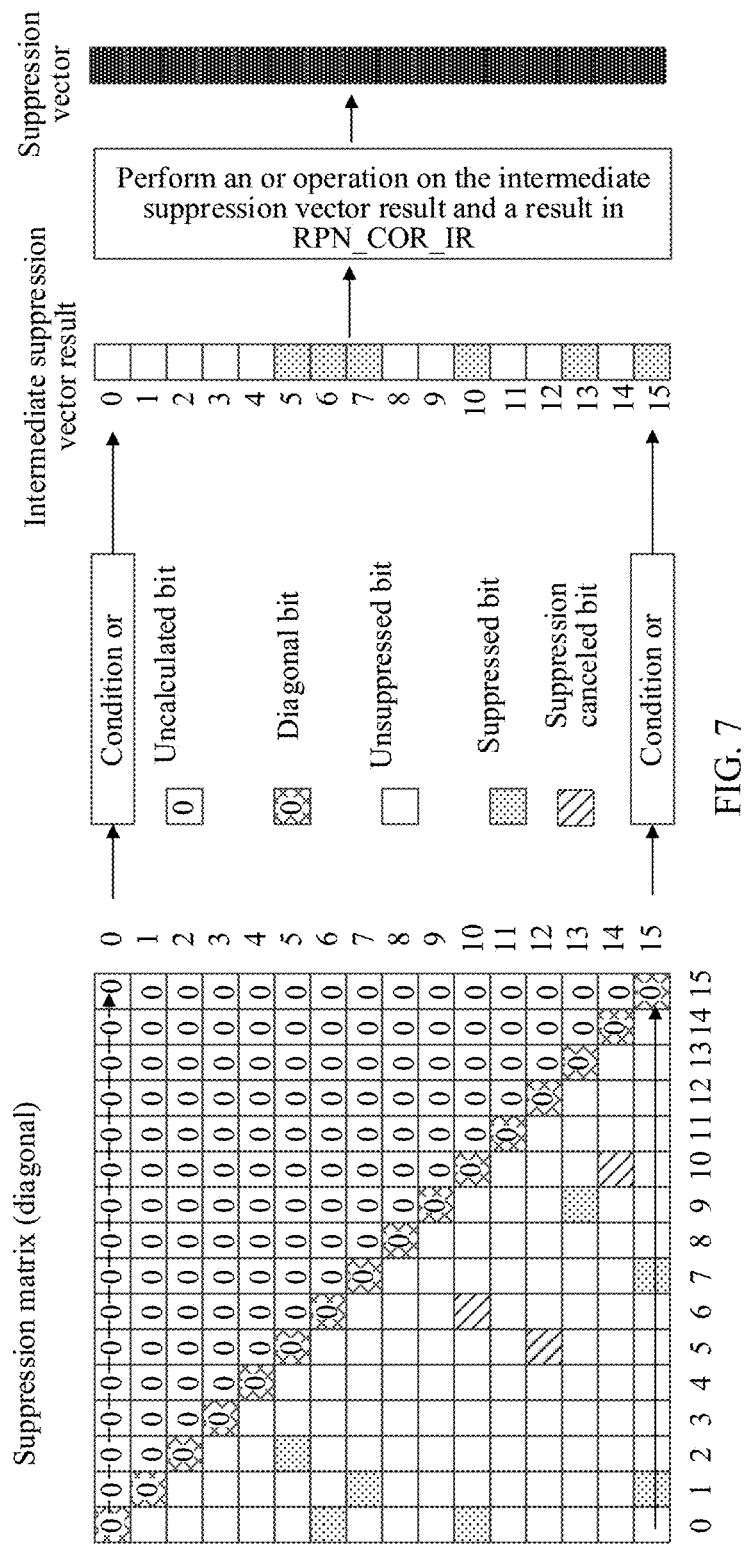
FIG. 7 is a schematic diagram of executing an RPN_COR_DIAG instruction according to this application.

For example, as shown in FIG. 7, a proposal region with the highest score is not suppressed, and therefore an intermediate suppression vector result is [0]=0. A proposal region 2 is not suppressed by a proposal region 0 and a proposal region 1, and therefore the proposal region 2 is not suppressed finally. However, a proposal region 5 is suppressed by the proposal region 2. Therefore, the proposal region 5 is suppressed finally. A proposal region 12 is suppressed by the proposal region 5, while the proposal region 5 has been suppressed. Therefore, suppression by the proposal region 5 on the proposal region 12 is canceled, and finally, the proposal region 12 is not suppressed. The bitwise or operation is performed on an intermediate result and a suppression result previously stored in the special register RPN_COR_IR to obtain final suppression vectors of the 16 proposal regions.

The RPN_COR instruction may be used to perform calculation based on a non-diagonal matrix block of the suppression matrix to obtain an intermediate suppression vector result. To be specific, the intermediate suppression vector result is calculated based on non-diagonal matrix blocks (K×K) of the suppression matrix and updated to the special register RPN_COR_IR. The RPN_COR instruction may support a duplication mode, and calculation can be implemented based on a plurality of non-diagonal matrix blocks by setting a quantity of repetition times. The RPN_COR instruction is used to complete the calculation in one beat, two beats, or three beats based on target frequencies, and is executed in a full pipeline manner. The RPN_COR instruction has three inputs: One is a non-diagonal matrix block (16×16) of the suppression matrix, a second one is a value of a 16 suppression vector with a higher score, and a third one is the special register RPN_COR_IR storing an intermediate result. During the calculation, if an input suppression vector is 1, suppression by the proposal region on a subsequent proposal region with a lower score needs to be canceled. An or operation is performed on a currently obtained suppression vector result and a result stored in the RPN_COR_IR, and a result is written to the special register RPN_COR_IR, so as to continuously accumulate calculation results. Finally, the RPN_COR_DIAG instruction is used to obtain the final suppression vectors of the 16 proposal regions.

Figure 8:
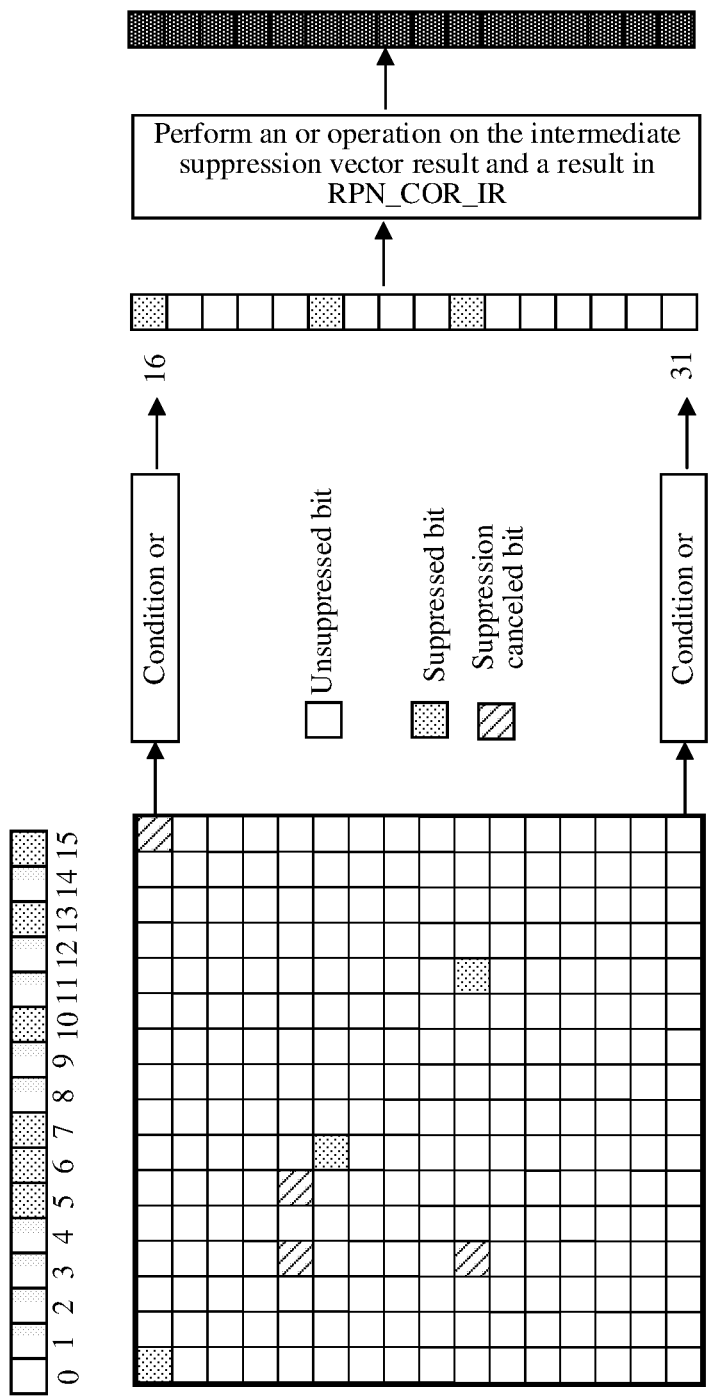
FIG. 8 is a schematic diagram of executing an RPN_COR instruction according to this application.

For example, as shown in FIG. 8, a proposal region 16 is suppressed by a proposal region 0, and the proposal region 0 is not suppressed, and therefore, suppression by the proposal region 0 on the proposal region 16 is valid. The proposal region 16 is further suppressed by a proposal region 15, but the proposal region 15 is suppressed. Therefore, suppression by the proposal region 15 on the proposal region 16 is canceled, and finally, a result is that the proposal region 16 is not suppressed in current calculation. A proposal region 20 is suppressed by both a proposal region 5 and a proposal region 7, but both the proposal region 5 and the proposal region 7 are suppressed. Therefore, suppression by the proposal region 5 and the proposal region 7 on the proposal region 20 is canceled, and finally, the proposal region 20 is not suppressed in the current calculation. Finally, a bitwise or operation is performed on 16 intermediate results obtained in of the current calculation and a value in the special register, and the special register is updated again.

Figures 9A, 9B:
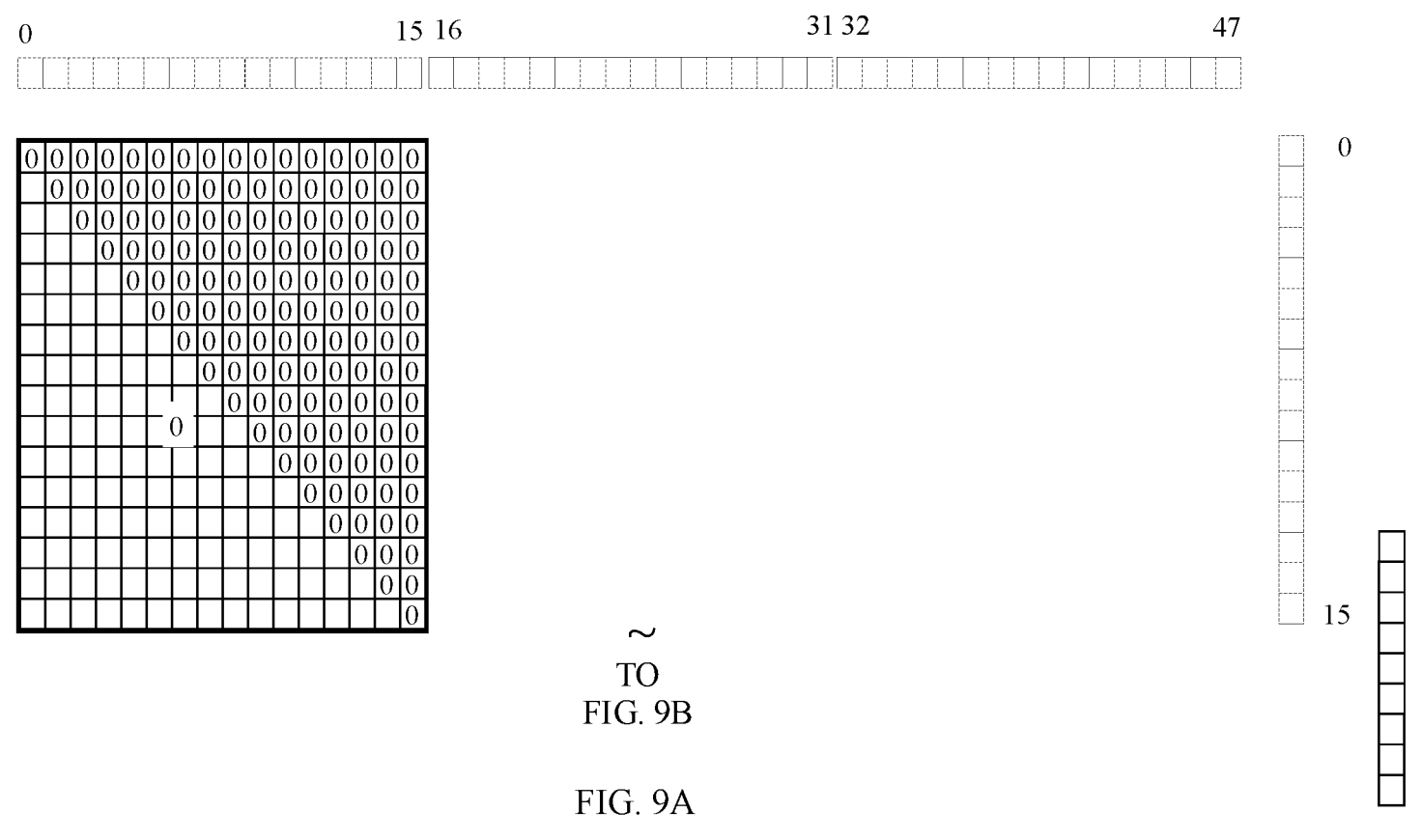

For another example, as shown in FIG. 9A and FIG. 9B, the RPN_COR instruction and the RPN_COR_DIAG instruction are jointly used. To obtain a value of a suppression vector [15:0], first, RPN_COR_IR is initialized to 0, and then RPN_COR_DIAG is invoked for a matrix block 0 once. To obtain a value of a suppression vector [31:16], first, RPN_COR_IR is initialized to 0, then RPN_COR is invoked for a matrix block 1 once, and RPN_COR_DIAG is invoked for a matrix block 2 once. To obtain a value of a suppression vector [47:32], first, RPN_COR_IR is initialized to 0, then RPN_COR is separately invoked for matrix blocks 3 and 4, and finally RON_COR_DIAG is invoked for a matrix block 5 once. For another example, three suppression matrices are obtained. First, RPN_COR_IR is initialized to 0. Then, the RPN_COR instruction is invoked to perform calculation based on matrix blocks of first two suppression matrices, to obtain an intermediate suppression vector result, and RPN_COR_IR is updated with the intermediate suppression vector result. RPN_COR_DIAG is invoked to perform calculation based on a matrix block of a third suppression matrix. A bitwise or operation is performed on a calculation result and the intermediate suppression vector result in the RPN_COR_IR to obtain a final suppression vector.

When the suppression vector of the $j^{th}$ group of proposal region sequence is determined, the register RPN_COR_IR is initialized to 0, the RPN_COR instruction is invoked, a quantity of repetition times is set to j−1, a source operand is a matrix block of a non-diagonal suppression matrix, the register RPN_COR_IR is updated with a result, and then RPN_COR_DIAG is invoked. In this way, the suppression vector of the $j^{th}$ group of proposal region sequence is obtained.

Step 204: Determine an unsuppressed proposal region based on a suppression vector of each group of proposal region sequence.

After suppression vectors of all groups of proposal region sequences are obtained, first M non-zero proposal regions, namely, first M unsuppressed proposal regions, may be used as final results.

Figure 10:
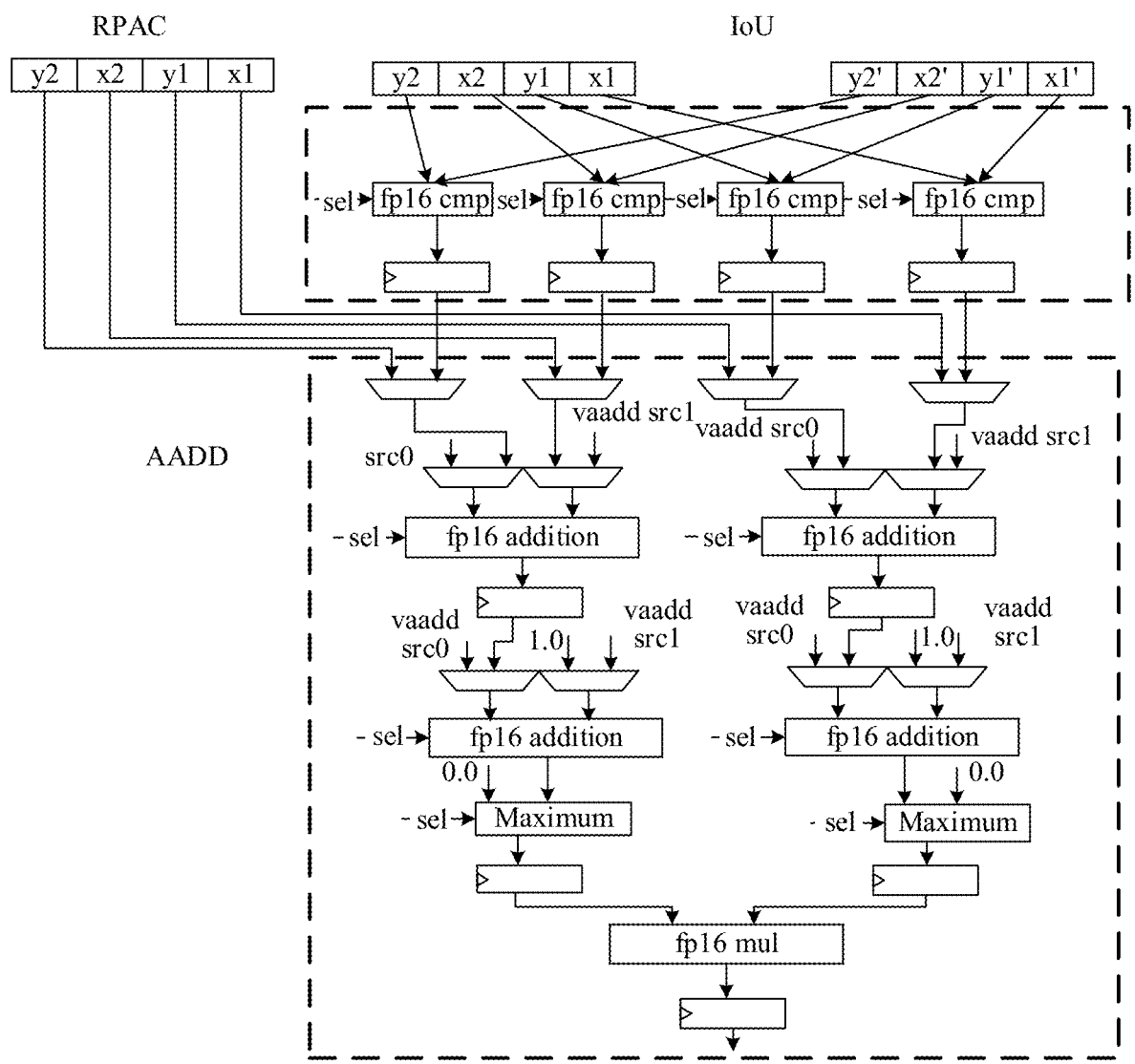
FIG. 10 is a schematic diagram of a hardware structure according to this application.

To better explain the data processing method provided in this application, the following describes a data processing process in a specific implementation scenario. FIG. 10 shows a hardware structure. The foregoing VRPAC instruction, VIOU instruction, and VAADD instruction are implemented by reusing one similar hardware structure. For the structure shown in FIG. 10, one VRPAC result, one VIOU result, and four VAADD results may be generated in one calculation. If more VRPAC, VIOU, or VAADD results need to be generated at a time, the foregoing circuit structure needs to be duplicated by several copies.

Based on the hardware structure shown in FIG. 10, an NMS calculation process is described with reference to the VRPAC instruction, the VIOU instruction, the VAADD instruction, the RPN_COR instruction, and the RPN_COR_DIAG instruction.

Specifically, a data type is fp16. 16 calculation results are generated at a time by using the VRPAC instruction; an overlapping area between every two proposal regions in two groups of proposal regions (16 proposal regions in each group) is calculated by using the VIOU instruction, and 256 calculation results are generated; an area sum of every two proposal regions in two groups of proposal regions (16 proposal regions in each group) is calculated by using the VAADD instruction, and 256 calculation results are generated; 16 intermediate suppression vector results are obtained at a time by using the RPN_COR instruction; and 16 suppression vectors are obtained at a time by using the RPN_COR_DIAG instruction.

It is assumed that N sorted proposal regions are input (it is assumed that N is a multiple of 16, N=16×R, and R is a total quantity of groups of proposal regions).

Step 1: Invoke the VRPAC instruction, and set a quantity of repetition times to R, to obtain values of areas of N proposal regions in a UB after the instruction is executed.

Step 2: Calculate a suppression vector result of a group 0 of proposal regions, where this step may be divided into the following substeps:

Step 2.1: Invoke the VIOU instruction to calculate an overlapping area between every two proposal regions in the group 0 of proposal regions (16 proposal regions).

Step 2.2: Invoke the VAADD instruction to calculate an area sum of every two proposal regions in the group 0 of proposal regions.

Step 2.3: Invoke an ordinary vector instruction (a scalar multiplication vector), and multiply a result obtained in step 2.2 by a parameter factor a.

Step 2.4: Invoke an ordinary vector comparison instruction to compare the overlapping area obtained in step 2.1 with the factor area sum obtained in step 2.3, to obtain one suppression matrix of the group 0 of proposal regions.

Step 2.5: Initialize a special register RPN_COR_IR to 0, and invoke the RPN_COR_DIAG instruction, to obtain a suppression vector of the group 0 of proposal regions, where a source operand of the RPN_COR_DIAG instruction is a result obtained in step 2.4.

Step 3: Calculate a suppression vector result of a group 1 of proposal regions, where this step may be divided into the following substeps:

Step 3.1: Invoke the VIOU instruction, and set a quantity of repetition times to 2, to obtain an overlapping area value between every two proposal regions in the group 0 of proposal regions and the group 1 of proposal regions, and an overlapping area value between every two proposal regions in the group 1 of proposal regions.

Step 3.2: Invoke the VAADD instruction, and set a quantity of repetition times to 2, to obtain an area sum of every two proposal regions in the group 0 of proposal regions and the group 1 of proposal regions, and an area sum of every two proposal regions in the group 1 of proposal regions.

Step 3.3: Invoke the ordinary vector instruction (the scalar multiplication vector), and multiply a result obtained in step 3.2 by the parameter factor a.

Step 3.4: Invoke the ordinary vector comparison instruction to compare a result obtained in step 3.1 with a result obtained in step 3.3, to obtain two suppression matrices of the group 1 of proposal regions.

Step 3.5: Initialize the special register RPN_COR_IR to 0, invoke the RPN_COR instruction, set a quantity of repetition times to 1, where a source operand is a matrix block of a non-diagonal suppression matrix, update a result into the register RPN_COR_IR, and then invoke RPN_COR_DIAG, to obtain a suppression vector of the group 1 of proposal regions.

Step N+1: Calculate a suppression vector result of a group (R−1) of proposal regions, namely, the last group of proposal regions, where this step may be divided into the following substeps:

Step ((N+1).1): Invoke the VIOU instruction, and set a quantity of repetition times to R, to calculate an overlapping area between every two proposal regions in the group 0 of proposal regions and the group (R−1) of proposal regions, an overlapping area between every two proposal regions in the group 1 of proposal regions and a group 2 of proposal regions, . . . , and an overlapping area between every two proposal regions in the group (R−1) of proposal regions.

Step ((N+1).2): Invoke the VAADD instruction, and set a quantity of repetition times to R, to calculate an area sum of every two proposal regions in the group 0 of proposal regions and the group (R−1) of proposal regions, an area sum of every two proposal regions in the group 1 of proposal regions and the group 2 of proposal regions, . . . , and an area sum of every two proposal regions in the group (R−1) of proposal regions.

Step ((N+1).3): Invoke the ordinary vector instruction, and multiply a result obtained in step ((N+1).2) by the parameter factor a.

Step ((N+1).4): Invoke the ordinary vector comparison instruction to compare a result obtained in step ((N+1).1) with a result obtained in step ((N+1).3), to obtain R suppression matrices of the group (R−1) of proposal regions.

Step ((N+1).5): Initialize the register RPN_COR_IR to 0, invoke the RPN_COR instruction, set a quantity of repetition times to (R−1), where a source operand is a matrix block of a non-diagonal suppression matrix, update a result into the register RPN_COR_IR, and then invoke RPN_COR_DIAG, to obtain a suppression vector of the group (R−1) of proposal regions.

Step N+2: Use first M non-zero proposal regions as a final result based on the suppression vectors.

In the foregoing embodiment, a time required for NMS calculation may be greatly shortened, calculation efficiency is greatly improved, and competitiveness in application fields related to image detection and image recognition is improved.

Figure 11:
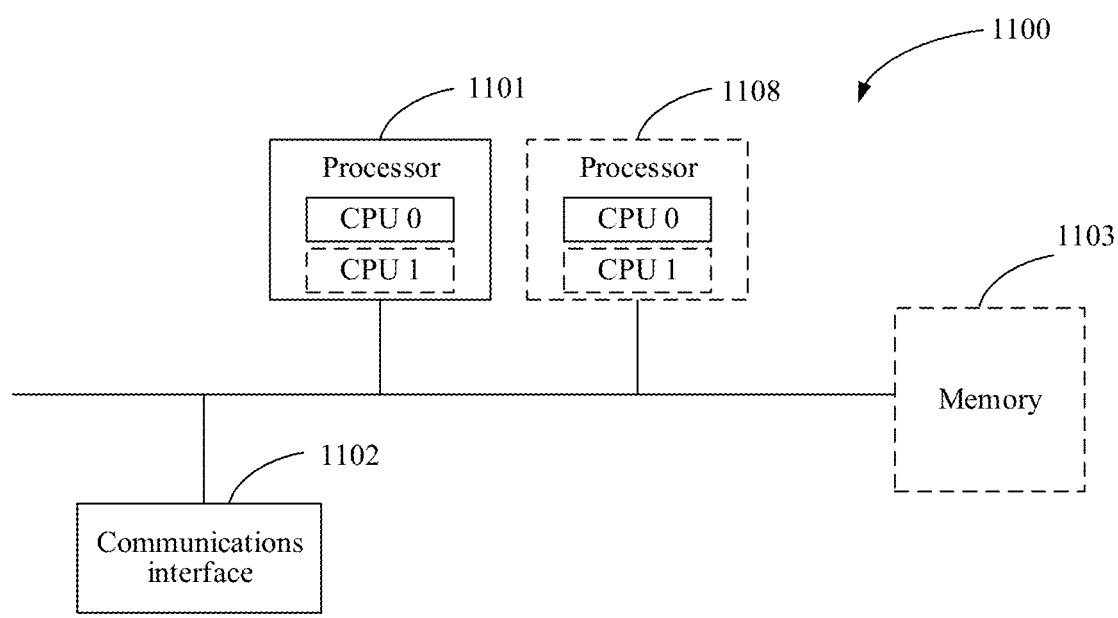
FIG. 11 is a schematic structural diagram of a data processing apparatus according to this application.

Based on a same technical concept, FIG. 11 shows an example of a structure of a data processing apparatus according to this application. The apparatus may perform a data processing procedure. The apparatus may be a chip, and may perform the data processing method in any one of the foregoing embodiments.

The apparatus 1100 includes at least one processor 1101 and a communications interface 1102, and optionally includes a memory 1103. The processor 1101, the communications interface 1102, and the memory 1103 are connected to each other.

The processor 1101 may be a general-purpose central processing unit, a microprocessor, an image processor, an application-specific integrated circuit, or one or more integrated circuits configured to control program execution in the embodiments of this application.

The communications interface 1102 is configured to input or output data.

The memory 1103 may be a read-only memory or another type of static storage device that can store static information and an instruction, or a random access memory or another type of dynamic storage device that can store information and an instruction, or may be an electrically erasable programmable read-only memory, a compact disc read-only memory or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or data structure and that can be accessed by a computer. However, the memory 1103 is not limited thereto. The memory 1103 may exist independently, and is connected to the processor 1101. Alternatively, the memory 1103 may be integrated into the processor. The memory 1103 is configured to store application program code for implementing the embodiments of this application, and the application program code is executed under control of the processor 1101. The processor 1101 is configured to execute the application program code stored in the memory 1103.

During specific implementation, in an embodiment, the processor 1101 may include one or more CPUs such as a CPU 0 and a CPU 1 in FIG. 11.

During specific implementation, in an embodiment, the apparatus 1100 may include a plurality of processors such as the processor 1101 and a processor 1108 in FIG. 11. Each of the processors may be a single-core processor, or may be a multi-core processor. The processor herein may be one or more devices, circuits, and/or processing cores configured to process data (for example, a computer program instruction).

Figure 12:
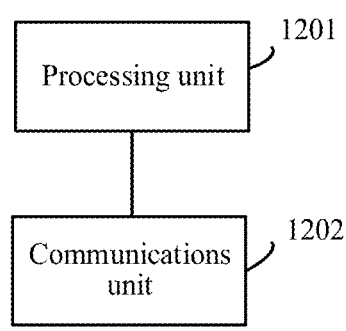
FIG. 12 is a schematic structural diagram of a data processing apparatus according to this application.

According to the present disclosure, the terminal device may be divided into function modules based on the foregoing method examples. For example, the function modules may be obtained through division based on corresponding functions, or at least two functions may be integrated into one processing module. The integrated module may be implemented in a form of hardware, or may be implemented in a form of a software function module. It should be noted that, in this application, module division is an example, and is merely logical function division. During actual implementation, another division manner may be used. For example, when the function modules are obtained through division based on the corresponding functions, FIG. 12 is a schematic diagram of an apparatus, the apparatus may be the terminal device in the foregoing embodiments, and the apparatus includes a processing unit 1201 and a communications unit 1202.

The communications unit 1202 is configured to obtain R groups of proposal region sequences, where each group of proposal region sequence includes a plurality of proposal regions, and R is a positive integer.

The processing unit 1201 is configured to: invoke a VRPAC instruction to calculate an area of each proposal region in each group of proposal region sequence, where the VRPAC instruction is used to calculate areas of K proposal regions at a single time, and K is associated with a data type; for a $j^{th}$ group of proposal region sequence in the R groups of proposal region sequences, invoke a VIOU instruction and a VAADD instruction to determine j suppression matrices of the $j^{th}$ group of proposal region sequence, and determine a suppression vector of the $j^{th}$ group of proposal region sequence based on the j suppression matrices, where the VIOU instruction is used to calculate an overlapping area between every two proposal regions in two groups of proposal region sequences at a single time, the VAADD instruction is used to calculate an area sum of the every two proposal regions in the two groups of proposal region sequences at a single time, and j is an integer greater than or equal to 1 and less than or equal to R; and determine an unsuppressed proposal region based on a suppression vector of each group of proposal region sequence.

In some embodiments, when invoking the VIOU instruction and the VAADD instruction to determine the j suppression matrices of the $j^{th}$ group of proposal region sequence, the processing unit 1201 is specifically configured to:

invoke the VIOU instruction to calculate an overlapping area between every two proposal regions in two adjacent groups of proposal region sequences in a first group of proposal region sequence to the $j^{th}$ group of proposal region sequence and an overlapping area between every two proposal regions in the $j^{th}$ group of proposal region sequence;

invoke the VAADD instruction to calculate an area sum of the every two proposal regions in the two adjacent groups of proposal region sequences in the first group of proposal region sequence to the $j^{th}$ group of proposal region sequence and an area sum of the every two proposal regions in the $j^{th}$ group of proposal region sequence;

use the area sum of the every two proposal regions in the two adjacent groups of proposal region sequences in the first group of proposal region sequence to the $j^{th}$ group of proposal region sequence and the area sum of the every two proposal regions in the $j^{th}$ group of proposal region sequence as factors; and compare a factor area sum of the every two proposal regions in the two adjacent groups of proposal region sequences in the first group of proposal region sequence to the $j^{th}$ group of proposal region sequence and a factor area sum of the every two proposal regions in the $j^{th}$ group of proposal region sequence with the overlapping area between the every two proposal regions in the two adjacent groups of proposal region sequences in the first group of proposal region sequence to the $j^{th}$ group of proposal region sequence and the overlapping area between the every two proposal regions in the $j^{th}$ group of proposal region sequence, to obtain the j suppression matrices of the $j^{th}$ group of proposal region sequence.

In some embodiments, when determining the suppression vector of the $j^{th}$ group of proposal region sequence based on the j suppression matrices, the processing unit 1201 is specifically configured to:

invoke an RPN_COR instruction to perform calculation based on the j suppression matrices, to obtain an intermediate suppression vector result; and;

invoke an RPN_COR_DIAG instruction to perform calculation based on the intermediate suppression vector result, to obtain the suppression vector of the $j^{th}$ group of proposal region sequence.

In some embodiments, the RPN_COR_DIAG instruction is used to perform calculation based on a diagonal matrix block of a suppression matrix to obtain a suppression vector, and the RPN_COR instruction is used to perform calculation based on a non-diagonal matrix block of the suppression matrix to obtain an intermediate suppression vector result.

An embodiment of this application further provides a computer storage medium, configured to store a computer software instruction used for the data processing. The computer software instruction includes program code designed for executing the foregoing method embodiments.

Persons skilled in the art should understand that the present disclosure may be provided as a method, a system, or a computer program product. Therefore, this application may use a form of hardware-only embodiments, software-only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of another programmable data processing device generate an apparatus configured to implement a specific function in one or more processes in the flowcharts and/or in one or more blocks in the block diagrams.

Alternatively, the computer program instructions may be stored in a computer readable memory that can instruct the computer or the another programmable data processing device to work in a specific manner, so that the instructions stored in the computer readable memory generate an artifact that includes an instruction apparatus, and the instruction apparatus implements a specific function in one or more processes in the flowcharts and/or in one or more blocks in the block diagrams.

Alternatively, the computer program instructions may be loaded onto a computer or another programmable data processing device, so that a series of operations and steps are performed on the computer or the another programmable data processing device, thereby generating computer-implemented processing. Therefore, the instructions executed on the computer or the another programmable device provide steps for implementing a specific function in one or more processes in the flowcharts and/or in one or more blocks in the block diagrams.

Definitely, persons skilled in the art can make various modifications and variations to this application without departing from the spirit and scope of this application. This application is intended to cover these modifications and variations to this application provided that these modifications and variations fall within the scope defined by the following claims and equivalent technologies of the claims of this application.

What is claimed is:

1. A data processing method, comprising:
obtaining, in a convolutional neural network, R groups of proposal region sequences, wherein each group of the proposal region sequences comprises a plurality of proposal regions, and R is a positive integer;

invoking, in the convolutional neural network a vector region proposal area calculation (VRPAC) instruction to calculate an area of each proposal region in each group of the proposal region sequences, wherein the VRPAC instruction is configured to calculate areas of K proposal regions at a single time, and K is associated with a data type;

for a $j^{th}$ group in the R groups of proposal region sequences, invoking a vector intersection over union (VIOU) instruction and a vector area add (VAADD) instruction to determine j suppression matrices of the $j^{th}$ group and determine a suppression vector of the $j^{th}$ group based on the j suppression matrices, wherein the VIOU instruction is configured to calculate an overlapping area between every two proposal regions in two groups of proposal region sequences at a single time, the VAADD instruction is configured to calculate an area sum of the every two proposal regions in the two groups of proposal region sequences at a single time, and j is an integer greater than or equal to 1 and less than or equal to R; and determining an unsuppressed proposal region based on a suppression vector of each group of the proposal region sequences.

2. The method according to claim 1, wherein invoking the VIOU instruction and the VAADD instruction to determine the j suppression matrices of the $j^{th}$ group further comprises:

invoking the VIOU instruction to calculate an overlapping area between every two proposal regions in two adjacent groups of the proposal region sequences in a first group of the proposal region sequences to the $j^{th}$ group and an overlapping area between every two proposal regions in the $j^{th}$ group;

invoking the VAADD instruction to calculate an area sum of the every two proposal regions in the two adjacent groups of the proposal region sequences in the first group of the proposal region sequences to the $j^{th}$ group and an area sum of the every two proposal regions in the $j^{th}$ group;

using the area sum of the every two proposal regions in the two adjacent groups of the proposal region sequences in the first group of the proposal region sequences to the $j^{th}$ group and the area sum of the every two proposal regions in the $j^{th}$ group as factors; and comparing a factor area sum of the every two proposal regions in the two adjacent groups of the proposal region sequences in the first group of the proposal region sequence to the $j^{th}$ group and a factor area sum of the every two proposal regions in the $j^{th}$ group with the overlapping area between the every two proposal regions in the two adjacent groups of the proposal region sequences in the first group of the proposal region sequence to the $j^{th}$ group and the overlapping area between the every two proposal regions in the $j^{th}$ group, to obtain the j suppression matrices of the $j^{th}$ group.

3. The method according to claim 1, wherein determining the suppression vector of the $j^{th}$ group of proposal region sequence based on the j suppression matrices further comprises:

invoking a region proposal network condition or for non-diagonal suppression matrix (RPN_COR) instruction to perform calculation based on first j−1 suppression matrices in the j suppression matrices, to obtain an intermediate suppression vector result; and invoking a region proposal network diagonal condition or for non-diagonal suppression matrix (RPN_COR_DIAG) instruction to perform calculation based on the $j^{th}$ suppression matrix in the j suppression matrices, and performing an OR operation on a calculation result and the intermediate suppression vector result to obtain the suppression vector of the $j^{th}$ group of proposal region sequence.

4. The method according to claim 3, wherein the RPN_COR_DIAG instruction is configured to perform a calculation based on a diagonal matrix block of a suppression matrix to obtain the suppression vector, and the RPN_COR instruction is configured to perform a calculation based on a non-diagonal matrix block of the suppression matrix to obtain the intermediate suppression vector result.

5. A data processing apparatus, comprising:

a memory storage comprising instructions; and one or more processors in communication with the memory, wherein the one or more processors execute the instructions to:

obtain, in a convolutional neural network, R groups of proposal region sequences, wherein each group of the proposal region sequences comprises a plurality of proposal regions, and R is a positive integer; and invoke, in the convolutional neural network, a vector region proposal area calculation (VRPAC) instruction to calculate an area of each proposal region in each group of proposal region sequences, wherein the VRPAC instruction is used to calculate areas of K proposal regions at a single time, K is associated with a data type; and, for a $j^{th}$ group in the R groups of the proposal region sequences, invoke a vector intersection over union (VIOU) instruction and a vector area add (VAADD) instruction to determine j suppression matrices of the $j^{th}$ group and determine a suppression vector of the $j^{th}$ group based on the j suppression matrices, the VIOU instruction is configured to calculate an overlapping area between every two proposal regions in two groups of the proposal region sequences at a single time, the VAADD instruction is configured to calculate an area sum of the every two proposal regions in the two groups of the proposal region sequences at a single time, and j is an integer greater than or equal to I and less than or equal to R; and determine an unsuppressed proposal region based on a suppression vector of each group of the proposal region sequences.

6. The apparatus according to claim 5, wherein when invoking the VIOU instruction and the VAADD instruction to determine the j suppression matrices of the $j^{th}$ group, the one or more processors further execute the instructions to:

invoke the VIOU instruction to calculate an overlapping area between every two proposal regions in two adjacent groups of the proposal region sequences in a first group of proposal region sequence to the $j^{th}$ group and an overlapping area between every two proposal regions in the $j^{th}$ group;

invoke the VAADD instruction to calculate an area sum of the every two proposal regions in the two adjacent groups of the proposal region sequences in the first group of proposal region sequence to the $j^{th}$ group and an area sum of the every two proposal regions in the $j^{th}$ group;

use the area sum of the every two proposal regions in the two adjacent groups of the proposal region sequences in the first group of the proposal region sequences to the $j^{th}$ group and the area sum of the every two proposal regions in the $j^{th}$ group as factors; and compare a factor area sum of the every two proposal regions in the two adjacent groups of the proposal region sequences in the first group of the proposal region sequences to the $j^{th}$ group and a factor area sum of the every two proposal regions in the $j^{th}$ group with the overlapping area between the every two proposal regions in the two adjacent groups of the proposal region sequences in the first group of the proposal region sequences to the $j^{th}$ group and the overlapping area between the every two proposal regions in the $j^{th}$ group, to obtain the j suppression matrices of the $j^{th}$ group.

7. The apparatus according to claim 5, wherein when determining the suppression vector of the $j^{th}$ group of proposal region sequence based on the j suppression matrices, the one or more processors further execute the instructions to:

invoke a region proposal network condition or for non-diagonal suppression matrix (RPN_COR) instruction to perform calculation based on first j−1 suppression matrices in the j suppression matrices, to obtain an intermediate suppression vector result; and invoke a region proposal network diagonal condition or for non-diagonal suppression matrix (RPN_COR_DIAG) instruction to perform calculation based on the $j^{th}$ suppression matrix in the j suppression matrices, and perform an OR operation on a calculation result and the intermediate suppression vector result to obtain the suppression vector of the $j^{th}$ group of proposal region sequence.

8. The apparatus according to claim 7, wherein the RPN_COR_DIAG instruction is configured to perform calculation based on a diagonal matrix block of a suppression matrix to obtain the suppression vector, and the RPN_COR instruction is configured to perform calculation based on a non-diagonal matrix block of the suppression matrix to obtain the intermediate suppression vector result.

9. A non-transitory computer-readable medium storing computer instructions, that when executed by one or more processors, cause the one or more processors to perform:

obtaining, in a convolutional neural network, R groups of proposal region sequences, wherein each group of the proposal region sequences comprises a plurality of proposal regions, and R is a positive integer; and invoking, in the convolutional neural network, a vector region proposal area calculation (VRPAC) instruction to calculate an area of each proposal region in each group of the proposal region sequences, wherein the VRPAC instruction is used to calculate areas of K proposal regions at a single time, and K is associated with a data type; for a $j^{th}$ group in the R groups of the proposal region sequences, invoke a vector intersection over union (VIOU) instruction and a vector area add (VAADD) instruction to determine j suppression matrices of the $j^{th}$ group and determine a suppression vector of the $j^{th}$ group based on the j suppression matrices, wherein the VIOU instruction is used to calculate an overlapping area between every two proposal regions in two groups of the proposal region sequences at a single time, the VAADD instruction is used to calculate an area sum of the every two proposal regions in the two groups of the proposal region sequences at a single time, and j is an integer greater than or equal to I and less than or equal to R; and determine an unsuppressed proposal region based on a suppression vector of each group of the proposal region sequences.

10. The non-transitory computer-readable medium according to claim 9, wherein when invoking the VIOU instruction and the VAADD instruction to determine the j suppression matrices of the $j^{th}$ group of proposal region sequence, the one or more processors are further enabled to perform:

invoking the VIOU instruction to calculate an overlapping area between every two proposal regions in two adjacent groups of the proposal region sequences in a first group of proposal region sequence to the $j^{th}$ group and an overlapping area between every two proposal regions in the $j^{th}$ group;

invoking the VAADD instruction to calculate an area sum of the every two proposal regions in the two adjacent groups of the proposal region sequences in the first group of proposal region sequence to the $j^{th}$ group and an area sum of the every two proposal regions in the $j^{th}$ group;

using the area sum of the every two proposal regions in the two adjacent groups of the proposal region sequences in the first group of the proposal region sequences to the $j^{th}$ group and the area sum of the every two proposal regions in the $j^{th}$ group as factors; and comparing a factor area sum of the every two proposal regions in the two adjacent groups of the proposal region sequences in the first group of the proposal region sequence to the $j^{th}$ group and a factor area sum of the every two proposal regions in the $j^{th}$ group with the overlapping area between the every two proposal regions in the two adjacent groups of the proposal region sequences in the first group of the proposal region sequences to the $j^{th}$ group and the overlapping area between the every two proposal regions in the $j^{th}$ group, to obtain the j suppression matrices of the $j^{th}$ group.

11. The non-transitory computer-readable medium according to claim 9, wherein when determining the suppression vector of the $j^{th}$ group of proposal region sequence based on the j suppression matrices, the one or more processors are further enabled to perform:

invoking a region proposal network condition or for non-diagonal suppression matrix (RPN_COR) instruction to perform calculation based on first j−1 suppression matrices in the j suppression matrices, to obtain the intermediate suppression vector result; and invoking a region proposal network diagonal condition or for non-diagonal suppression matrix (RPN_COR_DIAG) instruction to perform calculation based on the $j^{th}$ suppression matrix in the j suppression matrices, and perform an OR operation on a calculation result and the intermediate suppression vector result to obtain the suppression vector of the $j^{th}$ group of proposal region sequence.

12. The non-transitory computer-readable medium according to claim 11, wherein the RPN_COR_DIAG instruction is configured to perform calculation based on a diagonal matrix block of a suppression matrix to obtain the suppression vector, and the RPN_COR instruction is used to perform calculation based on a non-diagonal matrix block of the suppression matrix to obtain the intermediate suppression vector result.

* * * * *